US011197584B2

(12) United States Patent
Fynbo et al.

(10) Patent No.: US 11,197,584 B2
(45) Date of Patent: Dec. 14, 2021

(54) TEETHING SPOON

(71) Applicant: Busy Baby LLC, Oronoco, MN (US)

(72) Inventors: Beth Fynbo, Oronoco, MN (US); Aaron Nelson, Salt Lake City, UT (US); Edward Packer, Murray, UT (US)

(73) Assignee: Busy Baby LLC, Oronoco, MN (US)

( * ) Notice: Subject to any disclaimer, the term of this patent is extended or adjusted under 35 U.S.C. 154(b) by 0 days.

(21) Appl. No.: 17/144,852

(22) Filed: Jan. 8, 2021

(65) Prior Publication Data
US 2021/0120990 A1     Apr. 29, 2021

Related U.S. Application Data

(63) Continuation-in-part of application No. 16/893,216, filed on Jun. 4, 2020, which is a continuation of
(Continued)

(51) Int. Cl.
*A47J 43/28*     (2006.01)
*A61J 17/00*     (2006.01)

(52) U.S. Cl.
CPC .............. *A47J 43/28* (2013.01); *A61J 17/00* (2013.01)

(58) Field of Classification Search
CPC ........ A47J 43/28; A47J 43/281; A47J 43/282; A47J 43/287; A61J 17/00; A61J 17/10; A61J 17/02; A47G 21/04; A47G 21/045
(Continued)

(56) References Cited

U.S. PATENT DOCUMENTS 2,595,462 A *   5/1952   Johnson ................. A61J 17/02
                                                            D24/194
2,683,974 A      7/1954   Brown
(Continued)

FOREIGN PATENT DOCUMENTS

AU       2018200057 A1    7/2018
CN       201822503 U     9/2010
(Continued)

OTHER PUBLICATIONS

EZtotZ, Baby Utensils, retrieved on Dec. 21, 2020, pp. 2, available at: https://eztotz.com/collections/baby-led-weaning-utensils.
(Continued)

*Primary Examiner* — Jason Daniel Prone
(74) *Attorney, Agent, or Firm* — Headland Law & Strategy; Matthew J. Smyth

(57) ABSTRACT

A teething spoon may include a feeding end with a concave, textured surface configured to retain soft food and stimulate a tongue, mouth, or gums of a teething toddler; a base having a base diameter at its greatest extent and at least one aperture capable of receiving a removable tether; a handle coupling the feeding end to the base; and a safety guard adjacent the feeding end that extends perpendicularly. The safety guard may have a perpendicular reach of about 50 mm and may include a first loop and second loop opposite and in plane with the first loop. The first and second loops may allow a cylinder of about 10 mm or about 13 mm to pass through unobstructed. The base may comprise a generally hemispherical structure that enables the teething spoon to be disposed vertically. A slot in the base may be configured to accommodate a removable tether.

17 Claims, 18 Drawing Sheets

Related U.S. Application Data application No. 16/676,365, filed on Nov. 6, 2019, now Pat. No. 10,674,850, which is a continuation of application No. 16/284,898, filed on Feb. 25, 2019, now Pat. No. 10,470,599.

(60) Provisional application No. 62/725,169, filed on Aug. 30, 2018, provisional application No. 62/655,973, filed on Apr. 11, 2018.

(58) Field of Classification Search
USPC ............ 30/322–328; D24/193–195; D7/653; D4/101, 107, 108, 124
See application file for complete search history.

(56) References Cited

U.S. PATENT DOCUMENTS

| | | | |
|---|---|---|---|
| 2,910,264 A | 10/1959 | Lindenberger | |
| 3,376,974 A | 4/1968 | Hilliard | |
| 4,416,438 A | 11/1983 | King | |
| 4,425,711 A * | 1/1984 | Wood | A47G 21/04 30/324 |
| 4,756,497 A | 7/1988 | Lan et al. | |
| 5,053,262 A | 10/1991 | Kerr | |
| 5,291,878 A * | 3/1994 | Lombardo | A46B 7/06 15/167.2 |
| D396,292 S * | 7/1998 | Nowak | D24/195 |
| 5,829,627 A | 11/1998 | Martindale | |
| 5,860,190 A * | 1/1999 | Cano | A47G 21/02 30/322 |
| 6,115,923 A | 9/2000 | Gentry et al. | |
| 6,134,790 A * | 10/2000 | Watson | A47G 21/02 30/326 |
| 6,524,272 B1 | 2/2003 | Berry | |
| 6,581,541 B2 | 6/2003 | Hollinger | |
| 6,647,828 B2 * | 11/2003 | Hakim | A47G 21/04 30/324 |
| 6,676,210 B1 | 1/2004 | Peyton | |
| D491,420 S * | 6/2004 | Shibata | D7/653 |
| 6,746,735 B2 | 6/2004 | Snedeker | |
| 6,848,339 B2 | 2/2005 | Hakim | |
| 6,863,681 B2 * | 3/2005 | Dickerson | A61J 17/02 D24/195 |
| 6,865,815 B1 | 3/2005 | Dunn et al. | |
| D545,445 S | 6/2007 | Klein | |
| D619,370 S * | 7/2010 | Tegeder | D4/107 |
| 7,850,133 B2 | 12/2010 | Carnevali | |
| 7,878,467 B2 | 2/2011 | Chen | |
| D641,595 S | 7/2011 | Matari | |
| 8,387,263 B1 * | 3/2013 | Roberts | A47G 21/04 30/324 |
| 8,485,112 B1 | 7/2013 | Madden | |
| D688,046 S * | 8/2013 | Aslett | D24/195 |
| D695,361 S * | 12/2013 | Roehrig | D21/525 |
| D705,022 S * | 5/2014 | Meignan | D7/689 |
| 8,763,181 B1 | 7/2014 | Penfold | |
| D721,439 S * | 1/2015 | Swartz | D24/194 |
| 8,955,710 B2 | 2/2015 | Dotson | |
| D745,283 S * | 12/2015 | Phillips | D24/195 |
| D752,871 S * | 4/2016 | Montebelli | D4/104 |
| D768,303 S * | 10/2016 | Pauschitz | D24/195 |
| 9,462,903 B2 | 10/2016 | Laurain | |
| D790,929 S * | 7/2017 | Perez | D7/653 |
| D799,280 S * | 10/2017 | Shalev | D7/653 |
| D800,515 S | 10/2017 | Gonterman et al. | |
| D808,744 S * | 1/2018 | Hammi | D7/653 |
| D823,073 S | 7/2018 | Crowley | |
| 10,470,599 B2 * | 11/2019 | Fynbo | A47G 23/0306 |
| D871,772 S * | 1/2020 | Jimenez | D4/107 |
| D876,099 S * | 2/2020 | Murillo | D4/107 |
| D876,839 S * | 3/2020 | Murillo | D4/107 |
| D881,645 S * | 4/2020 | Ferrell | D7/653 |
| 10,674,850 B2 * | 6/2020 | Fynbo | A47G 23/0306 |
| D895,819 S * | 9/2020 | Douglas | D24/195 |
| D895,975 S * | 9/2020 | Jimenez | D4/104 |
| D902,601 S * | 11/2020 | Sun | D4/107 |
| D904,628 S * | 12/2020 | Kwon | D24/195 |
| 2003/0145471 A1 * | 8/2003 | Sano | A47G 21/04 30/324 |
| 2004/0194322 A1 * | 10/2004 | Bullard | A47G 21/08 30/326 |
| 2004/0200076 A1 * | 10/2004 | Tranfaglia | A47G 21/02 30/322 |
| 2004/0215234 A1 | 10/2004 | McCardell | |
| 2005/0036715 A1 | 2/2005 | Delaney | |
| 2005/0076814 A1 | 4/2005 | Madden | |
| 2005/0091854 A1 * | 5/2005 | Johnson | A47G 21/00 30/324 |
| 2006/0051555 A1 | 3/2006 | Tshantz | |
| 2007/0039192 A1 * | 2/2007 | Benson | A47G 21/00 30/327 |
| 2007/0151111 A1 * | 7/2007 | Hakim | A47G 21/04 30/324 |
| 2007/0207279 A1 | 9/2007 | Mesalic | |
| 2007/0251103 A1 * | 11/2007 | Rhodes, III | A47G 21/04 30/324 |
| 2008/0187709 A1 | 8/2008 | Hester et al. | |
| 2008/0245947 A1 | 10/2008 | Webb et al. | |
| 2008/0256807 A1 | 10/2008 | Kirkup | |
| 2009/0005810 A1 | 1/2009 | Bonazza | |
| 2009/0297743 A1 | 12/2009 | Ciaffara et al. | |
| 2010/0176626 A1 | 7/2010 | Centracco et al. | |
| 2010/0212115 A1 * | 8/2010 | Armstrong | A47J 43/28 16/422 |
| 2010/0239407 A1 | 9/2010 | Mills | |
| 2011/0036745 A1 | 2/2011 | Seter | |
| 2011/0106156 A1 | 5/2011 | Arbib | |
| 2011/0117808 A1 | 5/2011 | Fair | |
| 2011/0174677 A1 | 7/2011 | Blondeel et al. | |
| 2011/0210225 A1 | 9/2011 | Chen | |
| 2011/0214300 A1 * | 9/2011 | Matari | A47G 21/04 30/324 |
| 2011/0232102 A1 | 9/2011 | Holmes | |
| 2012/0228187 A1 | 9/2012 | Pharr | |
| 2014/0075763 A1 * | 3/2014 | Karns | A47G 21/08 30/322 |
| 2014/0197288 A1 | 7/2014 | Yang | |
| 2014/0259359 A1 | 9/2014 | Yaari et al. | |
| 2014/0299608 A1 | 10/2014 | Melo | |
| 2014/0361136 A1 | 12/2014 | Smith | |
| 2015/0108294 A1 | 4/2015 | Elliott | |
| 2015/0230638 A1 | 8/2015 | Jagger | |
| 2016/0108954 A1 | 4/2016 | Chen | |
| 2016/0128478 A1 | 5/2016 | Johnson | |
| 2017/0099994 A1 | 4/2017 | Gonterman et al. | |
| 2017/0215610 A1 | 8/2017 | Cohen et al. | |
| 2018/0078866 A1 * | 3/2018 | Rogone | A61J 17/1011 |
| 2018/0220622 A1 | 8/2018 | McLaughlin | |
| 2019/0159973 A1 * | 5/2019 | Windridge | A61J 17/02 |
| 2019/0239634 A1 * | 8/2019 | Jimenez | A46B 15/0097 |
| 2019/0290549 A1 * | 9/2019 | Qi | A61J 17/10 |

FOREIGN PATENT DOCUMENTS

| | | | | |
|---|---|---|---|---|
| EP | 2586420 B1 | | 10/2013 | |
| GB | 2285751 A | * | 7/1995 | A61J 17/101 |
| GB | 2400044 A | * | 10/2004 | A61J 17/02 |
| GB | 2434968 A | | 8/2007 | |
| GB | 2552512 A | * | 1/2018 | A61J 17/02 |
| KR | 200416517 A1 | | 2/2006 | |
| WO | 2002078495 A1 | | 10/2002 | |
| WO | 2018025073 A1 | | 8/2018 | |

OTHER PUBLICATIONS

Munchkin, Toddler, Utensils, retrieved on Dec. 21, 2020, pp. 7, available at: https://www.munchkin.com/toddler/utensils/infant-spoons.html.

"My Own Mat", Placement, Baby Gear, retrieved on Dec. 21, 2020, pp. 2, available at: https://www.myownmat.com/designer-placemats.

(56) References Cited

OTHER PUBLICATIONS

Nuby, Dipeez Spoons, Tableware, retrieved on Jan. 6, 2021, pp. 3, https://www.nuby.com/za/dipeez-spoons/.
Numnum, Our Products, retrieved on Dec. 21, 2020, pp. 3, available at: https://numnumbaby.us/pages/products.
PCT/US2021/012970, Written Opinion of the International Searching Authority, dated Mar. 25, 2021, pp. 1-6.
PCT/US2021/012970, International Search Report, dated Mar. 25, 2021, pp. 1-2.
Busy Baby) "It's Almost Here!!!! The Busy Baby Teething Spoon is going to be a game changer! I will probably open up pre-orders in a week or two and should be sending out orders in early February. Click the link to sign up for notification. You can be the very first to use the next genius product! Video in comments www.busybabymat.com/pages/teething-spoon-launch-opt-in" Facebook, Jan. 4, 2021 (Jan. 4, 2021). https://www.facebook.com/busybabymat/photos/a.338051193392138/986426565221261/.

* cited by examiner

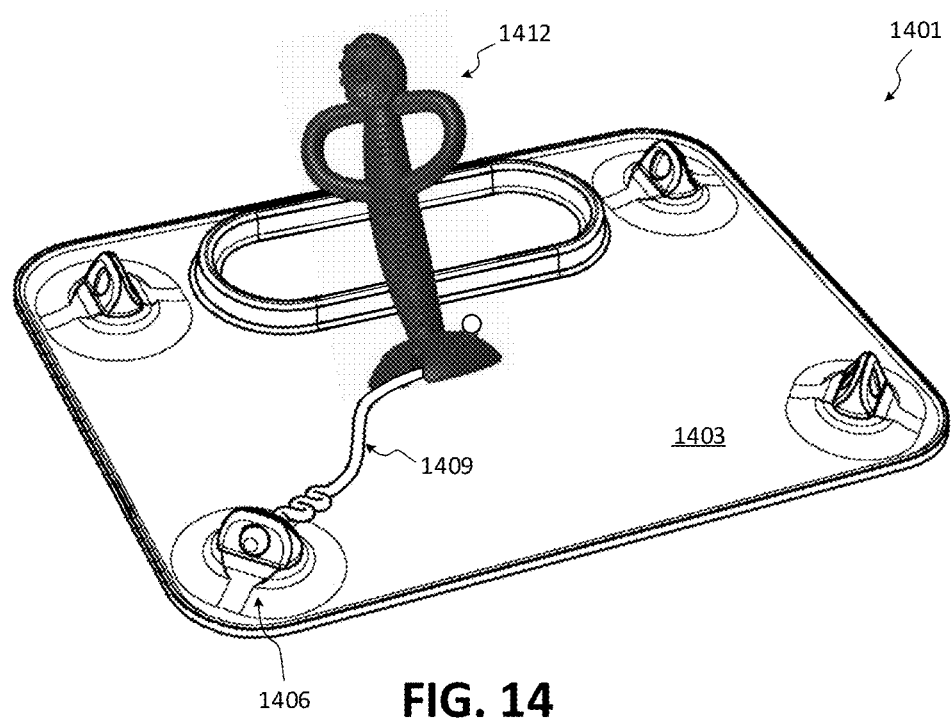
FIG. 14
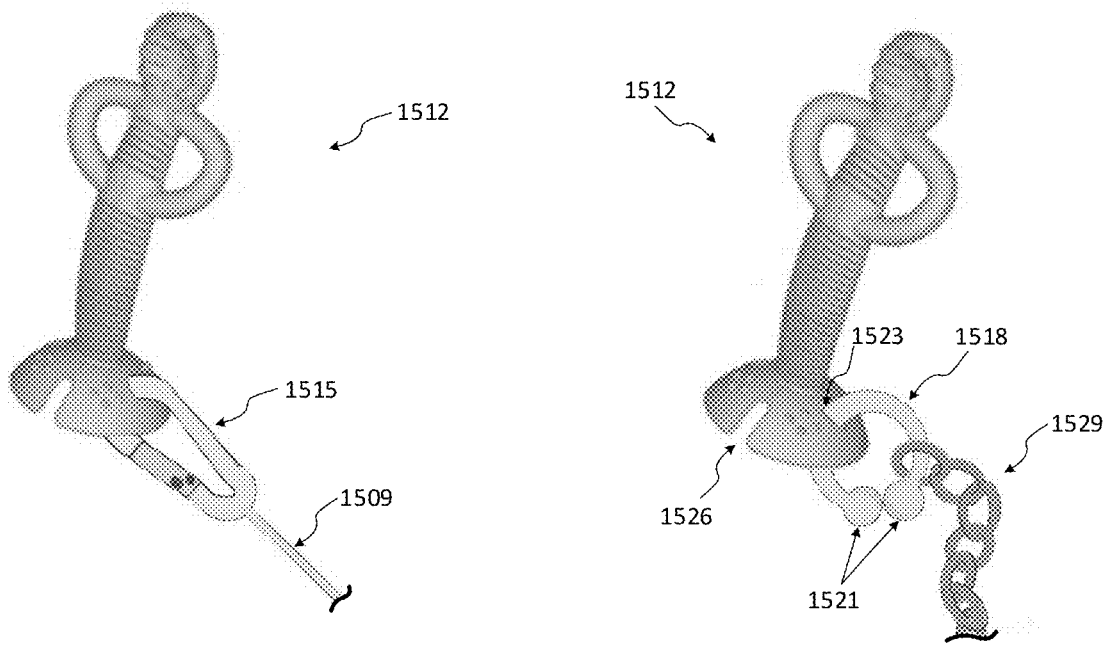
FIG. 15A  FIG. 15B

TEETHING SPOON

CROSS-REFERENCE TO RELATED APPLICATIONS

This application is a continuation-in-part of U.S. patent application Ser. No. 16/893,216, titled "Placemat Anchor and Tether System," filed on Jun. 4, 2020; which is a continuation of U.S. Utility application Ser. No. 16/676,365, titled "Placemat Anchor and Tether System," filed on Nov. 6, 2019, now U.S. Pat. No. 10,674,850; which is a continuation of U.S. patent application Ser. No. 16/284,898, titled "Placemat Anchor and Tether System," filed on Feb. 25, 2019, now U.S. Pat. No. 10,470,599; which claims priority to U.S. Provisional Application Ser. No. 62/725,169, titled "Placemat Anchor and Tether System," filed on Aug. 30, 2018, and U.S. Provisional Application Ser. No. 62/655,973, titled "Placement and Tether System," filed on Apr. 11, 2018. This application incorporates the entire contents of the foregoing applications herein by reference.

TECHNICAL FIELD

Various embodiments relate generally to placemats and placemat systems, and more particularly, to placemats that adhere to a surface and provide additional features suitable for young children and individuals with special needs, including, in some embodiments, a teething spoon.

BACKGROUND

Young children, particularly infants and toddlers, tend to touch everything they can reach as they develop tactile functionality and explore the world around them. Parents often attempt to provide safe things for their youngster to touch, chew on as they teethe, and generally play with, but often these items end up being dropped or tossed during the initial investigation. In many settings, this can be troublesome for parents as they must constantly pick things up off the ground and return them to the child. In addition, dropped objects can collect and pass germs to the child. Babies and toddlers are also learning how to move their bodies effectively for transportation, but early on, they do not have the coordination to do this smoothly and often tip over or fall when they are trying to reach for something that is out of reach.

Managing young children can be especially challenging for a caregiver when utensils, cups, bowls and other objects within reach of the child are mishandled and accidentally dropped, or, during certain phases of child development, intentionally and repeatedly thrown to the ground. To keep a child occupied, the caregiver may provide toys and other items of interest, which may also end up being dropped or repeatedly tossed to the ground, thus placing demands on the caregiver particularly in social situations, such as in restaurant settings.

SUMMARY

The present disclosure relates to a placemat and system allowing for efficient and effective tethering and anchoring of objects to the placemat, as well as improved securement of the placemat to a surface. The design of the placemat allows for efficient, low-cost manufacturing, as well as easy clean-up, storage and transport, among other numerous advantages that may be appreciated from the description that follows. The disclosure further relates to a teething spoon that can be used alone or in conjunction with a placemat and system.

In some embodiments, a teething spoon comprises a feeding end with a concave surface, a base opposite the feeding end, a handle, and a safety guard. The base may have a generally hemispherical structure with a base diameter at its greatest extent, configured to enable the teething spoon to be disposed vertically on a surface. The base may have at least one aperture configured to receive a removable tether. A handle may be configured to couple the feeding end to the base. The safety guard may be configured adjacent the feeding end and extend perpendicular to an axis of the handle. The safety guard may have a perpendicular reach of approximately 50 mm.

In some embodiments, the base diameter is at least about 50 mm. In some embodiments, the base may also include a slot configured to accommodate a removable tether anchored to the at least one aperture from within an interior of the generally hemispherical structure when the teething spoon is disposed vertically.

In some embodiments, a teething spoon comprises a feeding end with a concave surface, a base, a handle, and a safety guard. The handle, base, and safety guard may be configured to facilitate gripping of the teething spoon, by a toddler, at the handle between the base and safety guard. The feeding end may comprise a textured surface with a plurality of protrusions. The textured surface may be configured to stimulate a tongue, mouth, or gums of a teething toddler. In some embodiments, the textured surface may be configured to retain soft food. The handle may couple the feeding end and base. In some embodiments, the handle may have a textured surface.

The base may be configured opposite the feeding end and have a base diameter at its greatest extent. In some embodiments, the base diameter is at least 50 mm. The base may have an aperture configured to removably receive a tether. The base may further comprise a slot configured to accommodate a tether that is removably received by the aperture. In some embodiments, the base may have a generally hemispherical structure, configured to enable the teething spoon to be disposed vertically on a surface.

The safety guard may be disposed adjacent the feeding end and extend perpendicular to an axis of the handle. The safety guard may have a perpendicular reach of approximately 50 mm. In some embodiments, a safety guard includes a first loop and a second loop opposite that is in plane with the first loop. The interiors of the first and second loop may be configured to allow a 10 mm cylinder to pass through unobstructed. The interiors of the loops may be configured to allow a 13 mm cylinder to pass through unobstructed.

In some embodiments, a teething spoon comprises a material suitable for teething by a toddler or child. In some embodiments, a teething spoon may comprise an inner material and an outer material. The outer material may comprise a food-grade silicone having a Shore A durometer of about 65, and the inner material may comprise a material that has a greater hardness than the outer material.

In some embodiments, a teething spoon comprises a feeding end characterized by a concave surface, a base opposite the feeding end, a handle coupling the feeding end and base, and a safety guard that extends perpendicular to a handle axis and has a perpendicular reach. The base may comprise a base diameter at its greatest extent and at least one aperture capable of receiving a removable tether. The base diameter and perpendicular reach may be configured to prevent choking by a toddler who is teething on the teething spoon. In some implementations, the base diameter and perpendicular reach may each be at least approximately 50 mm.

In some embodiments, a system comprises a mat body, a plurality of anchors, an elongated tether, and a teething spoon. The mat body may be characterized by a front side, a back side, and a thickness. Each anchor may have an anchor block having an aperture characterized by an aperture diameter, a suction cup having a sealing surface and an outer surface, and a stem that connects the anchor block to the suction cup. Each anchor may be disposed through the thickness, such that its anchor block is on the front side and its suction cup extends from the back side. The elongated tether may have a first end and a second end. The first end may be configured to removably couple to one of the plurality of anchors, and the second end may be configured to be removably coupled to a base aperture on the teething spoon. The teething spoon may comprise a feeding end with a concave surface; a base opposite the feeding end with a base diameter at its greatest extent and at least one base aperture having a base-aperture diameter; a handle coupling the feeding end and base; and a safety guard adjacent the feeding end perpendicular to an axis of the handle. The safety guard may have a perpendicular reach. At least one of the mat body, the elongated tether, and the teething spoon may comprise a food-grade silicone.

In some embodiments, a base may be configured to enable a teething spoon to be disposed vertically on a surface. In some embodiments, the base may further comprise a slot configured to accommodate an elongated tether that is removably coupled to a teething spoon from an interior of the generally hemispherical structure.

In some embodiments, a system may comprise a mat body, a plurality of anchors, an elongated tether, and a teething spoon. The mat body may be characterized by a front side, a back side, and a thickness. In some embodiments, there may be a lip around the perimeter of the mat body. The mat body may have a receptable formed by a raised boundary. The mat body, the lip, and the receptacle may be constructed from the same material.

Each anchor may comprise an anchor block having an aperture characterized by an aperture diameter, a suction cup having a sealing surface and an outer surface, and a stem that connects the anchor block to the suction cup. Each anchor block may be disposed through the thickness of the mat body, such that its anchor block is on the front side and its suction cup extends from the back side. In some embodiments, at least one anchor may be disposed parallel to a side edge of the mat body and at least one anchor may be disposed at an angle of between 30 and 60 degrees relative to the side edge. In some embodiments, one of the outer surfaces and a wall of an adjacent recess in the thickness may have a textured finish configured to prevent coupling between the outer surface and the wall. In some embodiments, a sealing surface may have a glossy finish configured to facilitate coupling to a substrate adjacent the back side.

The elongated tether may comprise a first end and a second end. In some embodiments, an elongated tether may comprise a carabiner at the first or second end.

The teething spoon may comprise a feeding end having a concave surface, a base opposite the feeding end coupled by a handle, and a safety guard adjacent the feeding end that extends perpendicular to an axis of the handle and has a perpendicular reach. The base may have a base diameter at its greatest extent and at least one base aperture having a base-aperture diameter. In some embodiments, the base diameter and perpendicular reach may each be at least about 50 mm. The base diameter and perpendicular reach may also be configured to prevent chocking by a toddler who is teething on the teething spoon. In some embodiments, a base may comprise a generally hemispherical structure configured to enable a teething spoon to be disposed vertically on a surface. In some embodiments, a base may further comprise a slot that is configured to accommodate an elongated tether when the elongated tether is removably coupled to the base aperture from within an interior of the generally hemispherical structure.

In some embodiments, the first end of the elongated tether may be removably coupled to one of the plurality of anchors, and the second end may be removably coupled to the base aperture. In some embodiments, the first end and second end may be configured to be removably coupled to one of the anchors or to a base aperture, respectively, with a compression fit. In some embodiments, a first end and second end may comprise an anchor terminus. The anchor terminus may be characterized by an anchor diameter, where the anchor diameter is greater than each of the aperture diameter and base-aperture diameter. In some embodiments, the aperture diameter may be approximately 6 mm and the aperture diameter and base-aperture diameter may each be approximately 10 mm.

At least one of the mat, the elongated tether, and the teething spoon may have a Shore A durometer of between about 45 and about 65. In some embodiments, at least one of these may comprise a food-grade silicone.

BRIEF DESCRIPTION OF THE DRAWINGS

FIG. 14 illustrates an exemplary system including a mat, an elongated tether and a teething spoon.

FIGS. 15A and 15B illustrate alternative embodiments for tethers.

DETAILED DESCRIPTION

Described herein is a placemat and tether system that can provide a toddler with both a clean surface for food and toys, and a tether system for anchoring such toys or eating utensils close to the toddler. This system can protect the toddler from germs on a surrounding surface (e.g., a tabletop at a restaurant), and it can prevent tethered toys or utensils from being thrown onto the ground—thereby minimizing germ exposure and distractions to a caregiver who may otherwise need to constantly retrieve toys or utensils that are flung onto the floor or out of reach by the toddler.

This system can, for example, provide benefit for users in a restaurant setting. As another example, a caregiver may use the placemat and tether system to anchor bath toys adjacent a baby bathtub to keep the toys within reach of a baby just learning to grasp objects. As another example, a caregiver for an adult patient suffering from a motor control or movement disorder may use the system to tether eating utensils in a manner that keeps them within the patient's reach, to provide the patient with a more satisfying and independent eating experience.

Figure 1A:
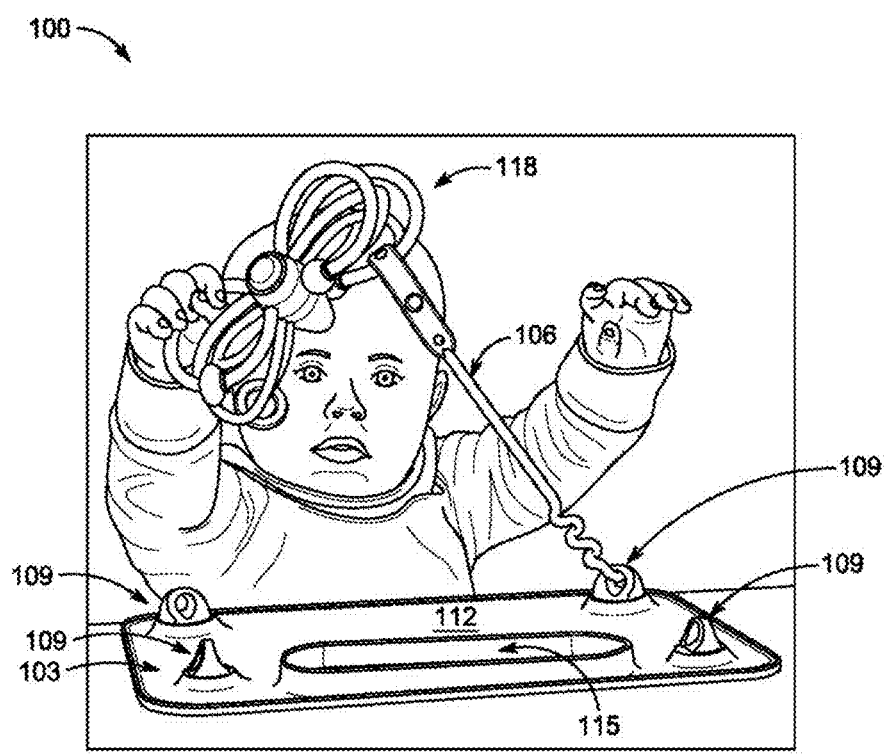
FIG. 1A is a perspective view of a placemat and tether system in use by a young child.
Figure 1B:
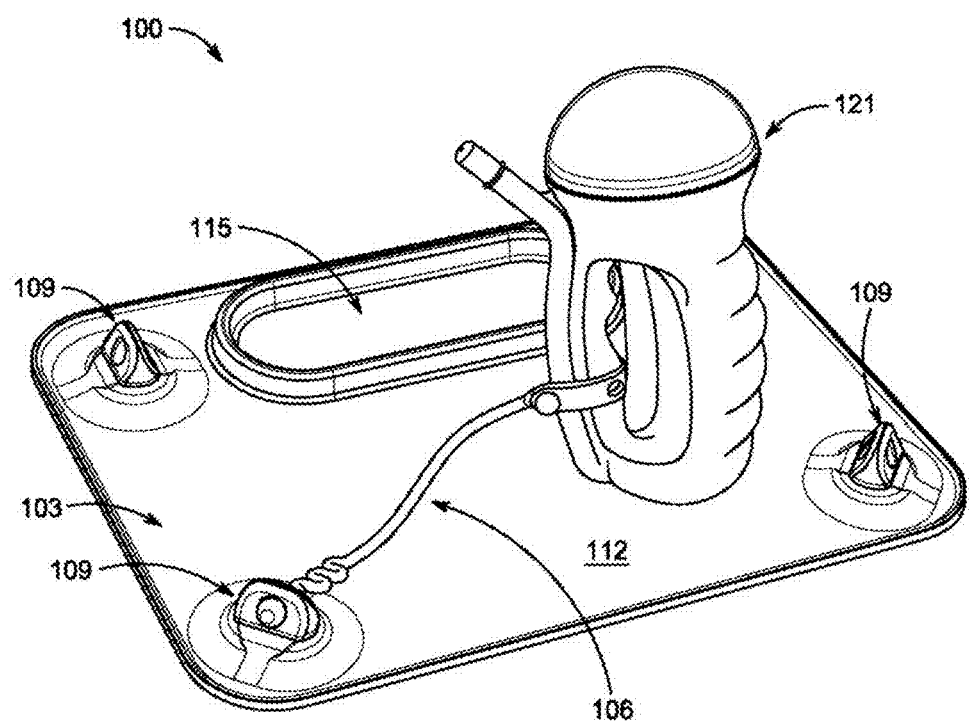
FIG. 1B is a perspective view of a placement and tether system used to secure an object.

FIGS. 1A and 1B illustrate an exemplary placemat and tether system 100 in use. In this embodiment, the system 100 comprises a placemat 103 and an elongated tether 106. The placemat 103 comprises a plurality of anchors 109 that each can include a means for retaining the elongated tether 106 and a means for affixing the placemat to a surface or substrate such as a table. Exemplary anchors are described in more detail with reference to FIGS. 3A-C and FIGS. 4A, B.

The placemat 103 provides an easily cleanable front surface 112 and can include one or more receptacles, such as receptacle 115, which can be used for containing food items or other objects. A toy 118, cup 121 or other utensil can be secured to an end of the elongated tether 106 opposite the end that is secured to an anchor 109.

Figure 2A:
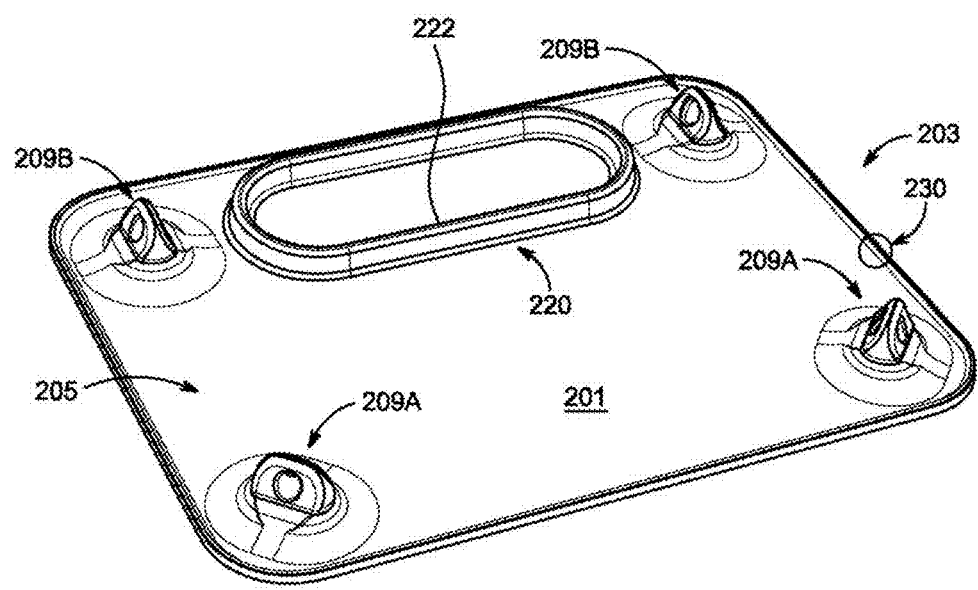
FIG. 2A is a perspective view of the front side of an exemplary placemat.
Figure 2B:
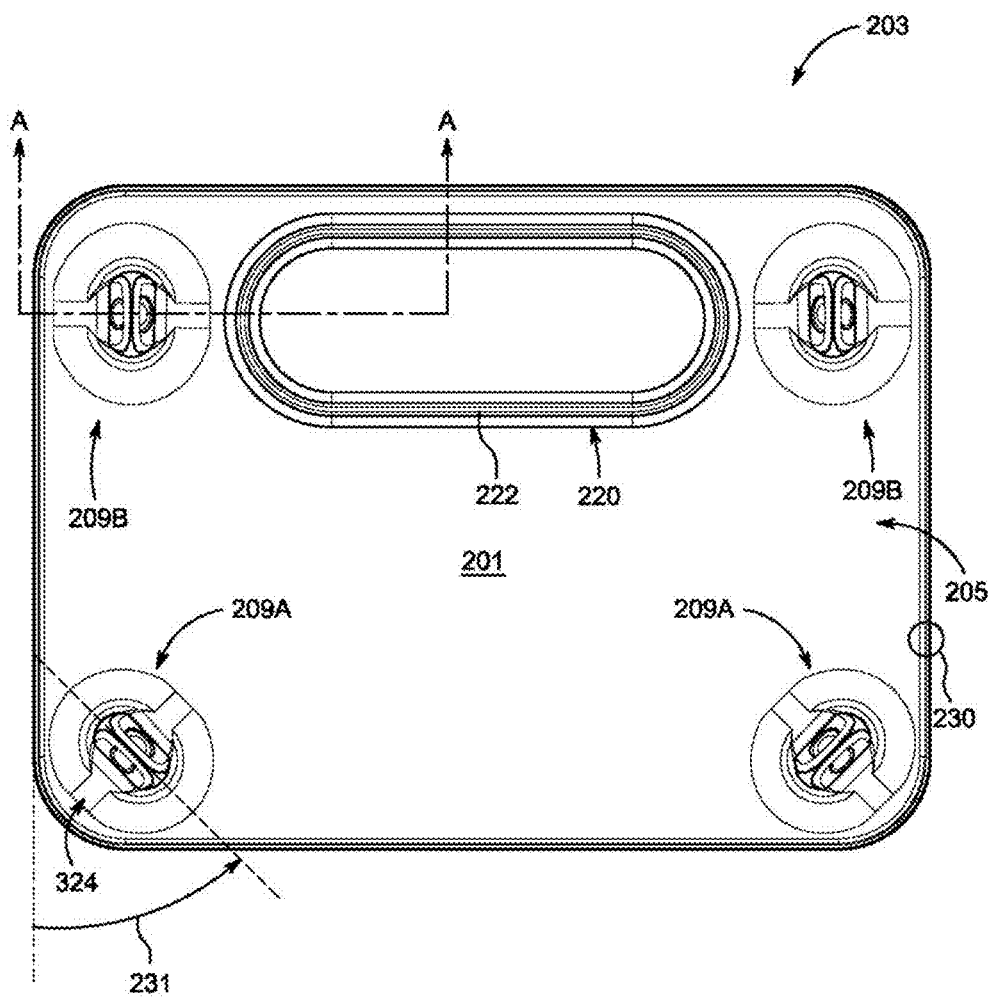
FIG. 2B is a top view of the front side of an exemplary placemat.
Figure 2C:
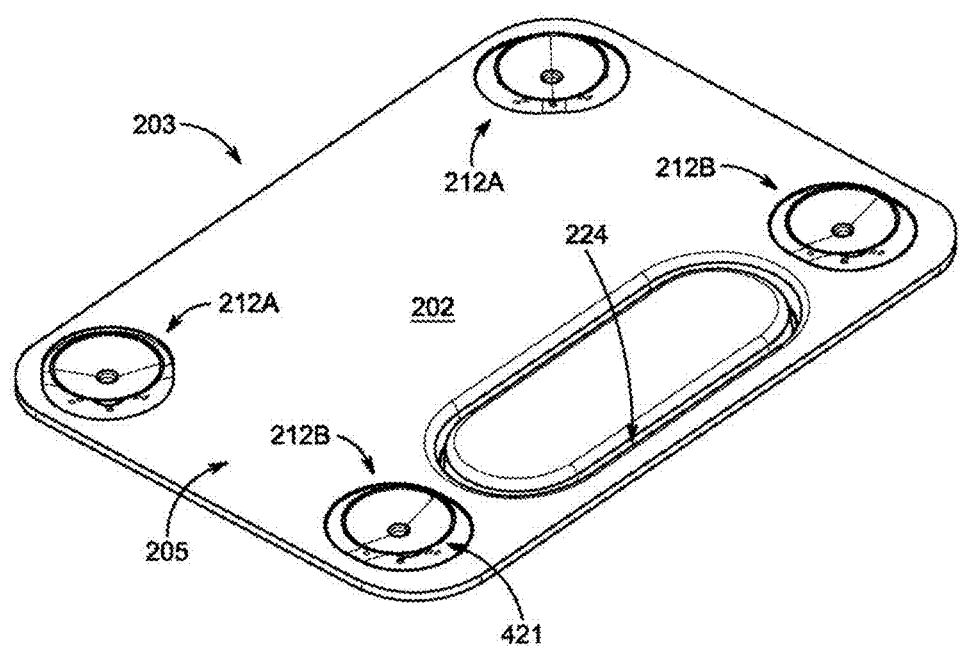
FIG. 2C is a perspective view of the back side of an exemplary placemat.
Figure 2D:
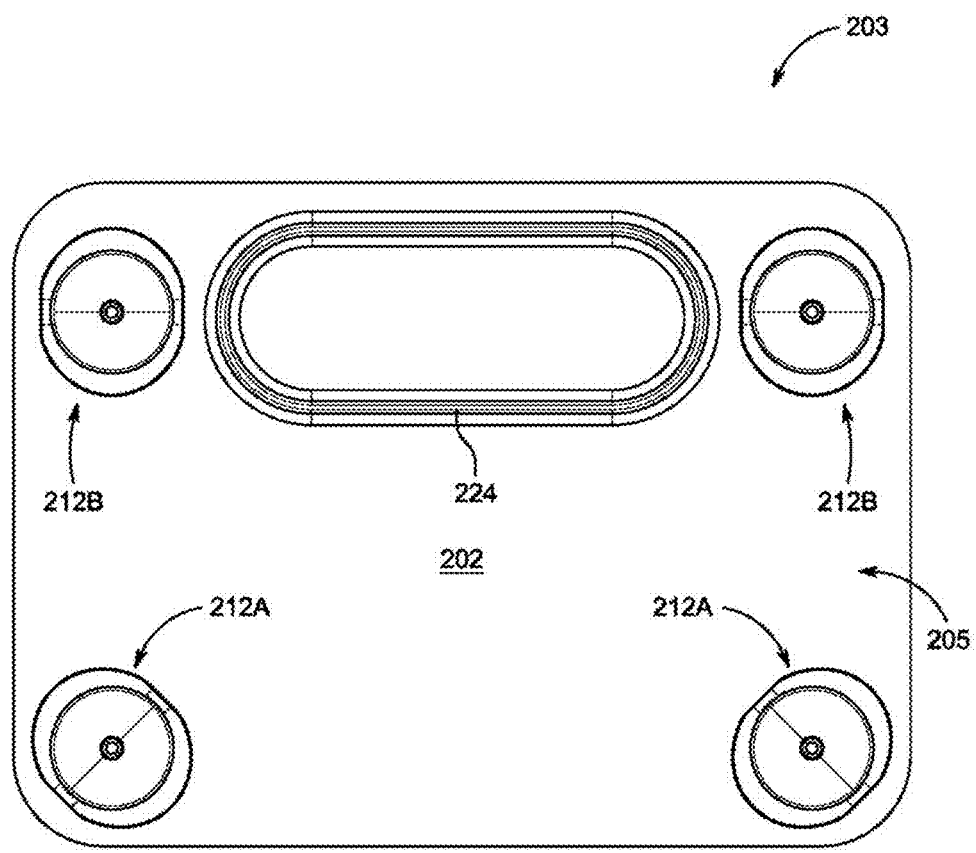
FIG. 2D is a top view of the back side of an exemplary placemat.

FIG. 2A and FIG. 2B are, respectively, perspective and top views of a front side 201 of another embodiment of a placemat 203 for use in a placemat and tether system; FIG. 2C and FIG. 2D are, respectively, perspective and top views of a back side 202 of the placemat 203.

Figure 4A:
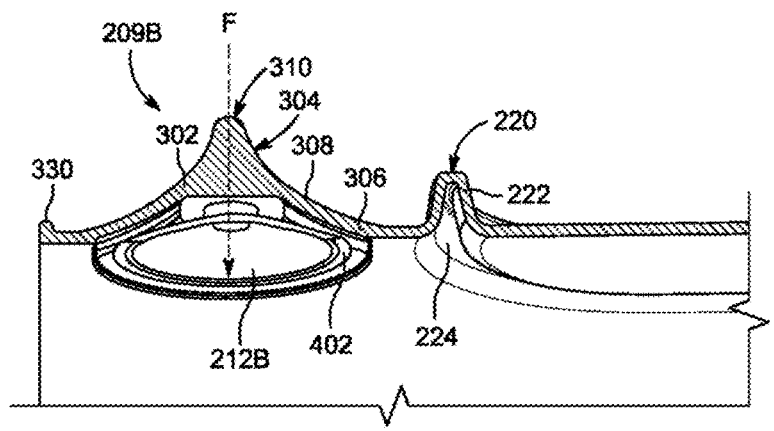
FIG. 4A is a cross-sectional perspective view taken along line A-A of the placemat of FIG. 2B.
Figure 4B:
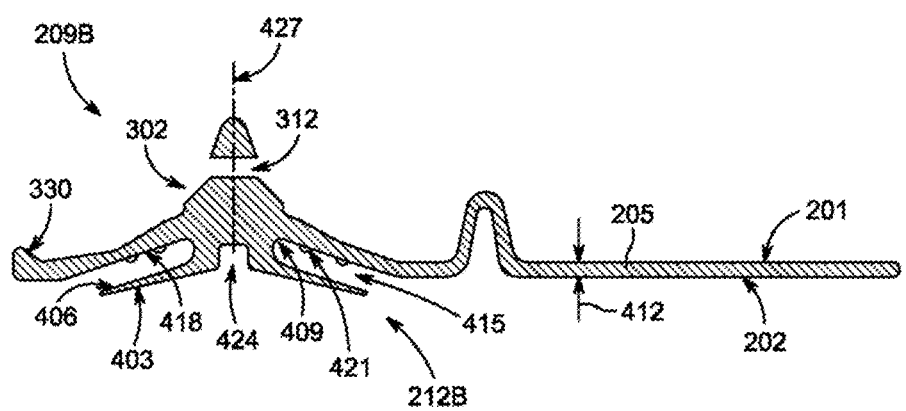
FIG. 4B is a cross-sectional view taken along line A-A of the placemat of FIG. 2B.

In the embodiments shown in FIGS. 2A-2D, the placemat 203 comprises a mat body 205, a front side 201, a back side 202 and a thickness 412 (shown with reference to FIG. 4B). The front side 201 is the side that generally faces or is otherwise accessible to a user of placemat 203. The back side 202 is the side that faces a substrate upon which the placemat 203 is secured. A suitable substrate could include, for example, a top surface of a table or high chair, or a vertical surface, such as a refrigerator door, bathtub or shower wall, patio door or window.

Front side 201 and back side 202 may comprise a finished surface to impart desired haptics or functionality to placemat 203. In one example, front side 201 comprises a matte finish with a desirable feel and appearance, while back side 202 comprises a glossy finish to improve friction and stick between a surface of back side 202 and a surface of a substrate upon which placemat 203 is placed or secured.

To provide added functionality to placemat 203, one or more receptacles 220 may be formed on front side 201 of placemat 203 and may be defined by a raised boundary 222 extending from a surface of front side 201. Food or other objects may be placed and organized in receptacle(s) 220 for easy reach and access by a user of placemat 203. Although shown as a single oval shape in FIGS. 2A and 2B, it may be appreciated that the number, shape and dimensions of the receptacle(s) 220 may be flexibly designed, configured and manufactured based on the anticipated needs of anticipated users (e.g., babies, toddlers, adults with muscle or movement disorders, etc.).

In some embodiments, the boundary 222 may correspond to a recess 224 on the back side 202 that reduces the amount of material required in forming boundary 222 and placemat 203 or for providing improved compressibility and flexibility of boundary 222 to facilitate rolling-up and storage of placemat 203.

A lip 230 may be formed around a perimeter of the front side 201 of the placemat 203 to help contain spillage of foods or liquids on a surface of front side 201 during use. Boundary 222 may provide the same function with respect to foods or liquids spilled within the area of receptacle 220. It may be appreciated that the height of boundary 222 as well as lip 230 may be any suitable dimension to sufficiently prevent the spilling of foods or liquids beyond the boundary 222 or lip 230 of placemat 203 while not interfering with rolling-up or storing of the placemat 203 when not in use. In some embodiments, the lip 230 may extend approximately 1 mm to 5 mm above the front-side surface 201; in other embodiments, the lip 230 may extend approximately 1 mm to 3 mm above the front-side surface 201. In some embodiments, the boundary 222 may extend 10 mm to 50 mm above the front-side surface 201; in some embodiments, the boundary 222 may extend 20 mm to 40 mm above the front-side surface 201; in some embodiments, the boundary 222 may extend 30 mm above the front-side surface 201.

Figure 5:
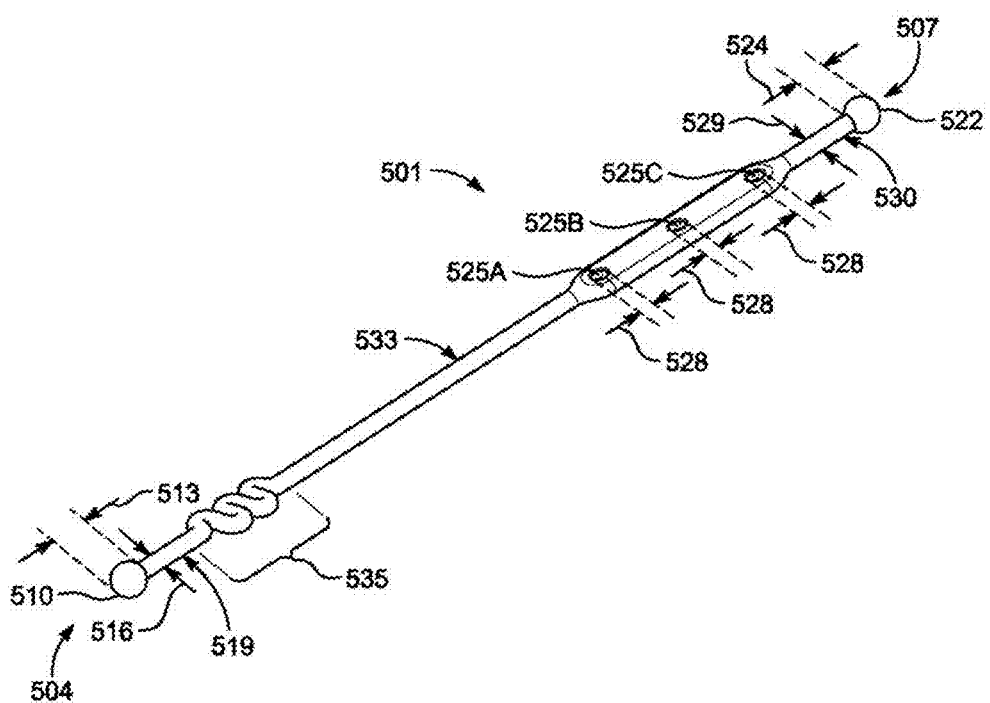
FIG. 5 is a perspective view of one embodiment of a tether suitable for placemat anchors.
Figure 7:
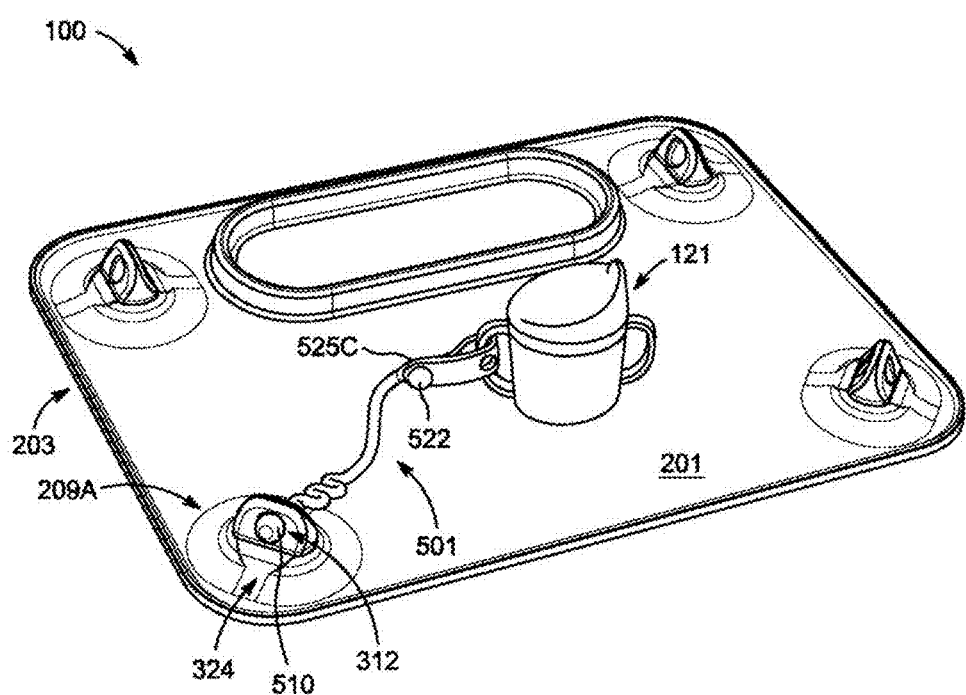
FIG. 7 is a placemat system showing the tether attached to an anchor of the placemat and to an object.

In the embodiment shown in FIGS. 2A and 2B, a plurality of anchors 209A and 209B are provided on front side 201 of the placemat 203. Each anchor 209A or 209B is configured to receive an elongated tether, such as elongated tether 106 (FIGS. 1A and 1B), or elongated tether 501 (FIGS. 5 and 7). Although four anchors 209A, 209B are shown, any suitable number of anchors may be provided. However, having at least four anchors 209A, 209B, one in proximity to each corner of placemat 203, can be advantageous for securing the four corners of a rectangular placemat 203.

Turning to FIG. 2C, a plurality of suction cups 212A, 212B are provided on back-side surface 202 of placemat 203. In some embodiments, each suction cup 212A, 212B has a structure that is integral with corresponding anchor 209A or 209B on the front side 201 of placemat 203. That is, in such embodiments, the anchor 209A or 209B is directly connected to the corresponding suction cup 212A or 212B through the thickness 412 of the mat body 205, via a stem 409 (see FIG. 4B). In some embodiments, the stem 409 and the suction cup 212B are coaxial, and the axis 427 runs through the aperture 312 (see FIGS. 3A-C, 4B).

Figure 3A:
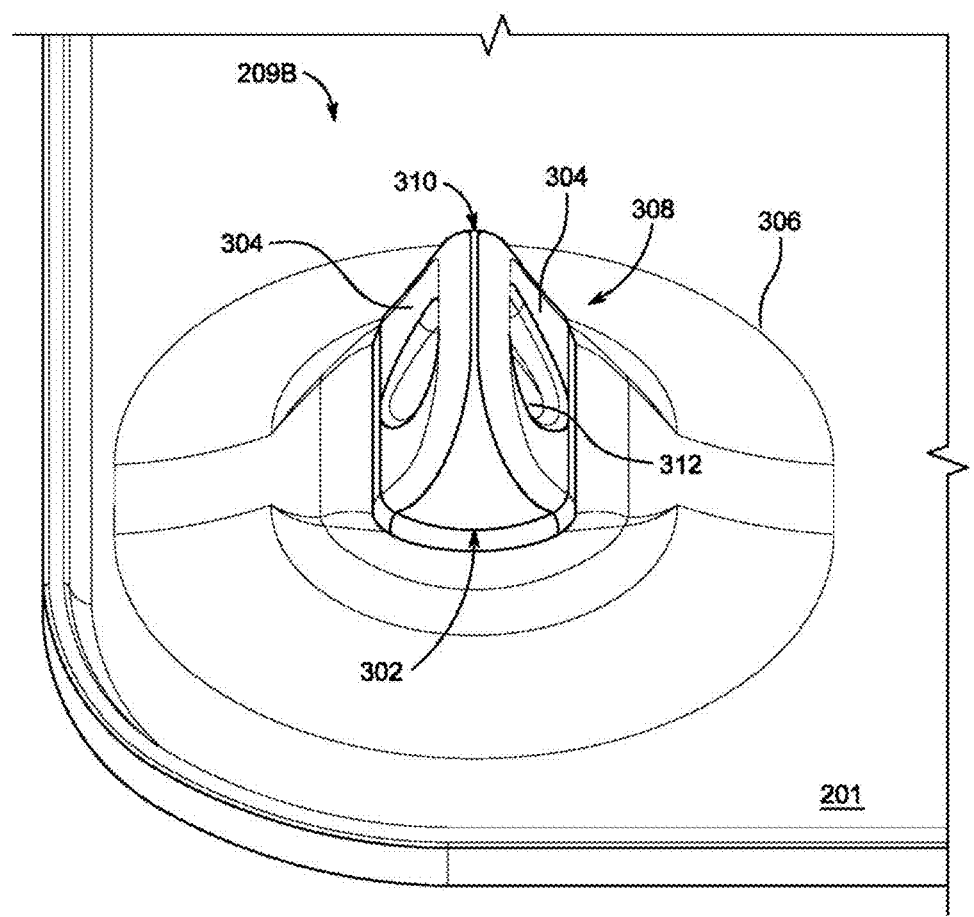
FIG. 3A is a perspective view of an exemplary anchor.
Figure 3B:
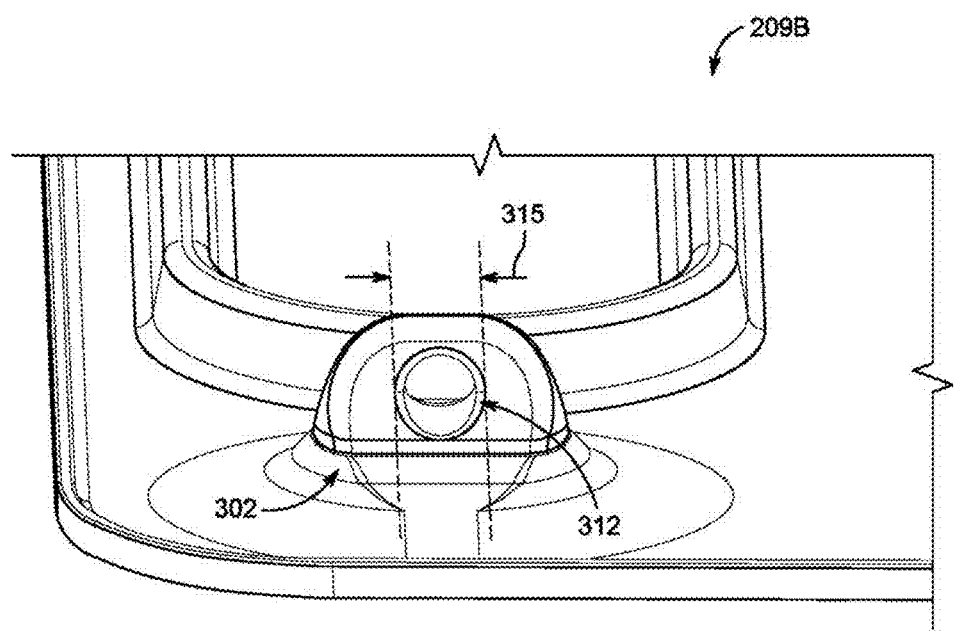
FIG. 3B is a another perspective view of the exemplary anchor of FIG. 3A.

FIGS. 3A and 3B are exploded perspective views of the tether anchors 209B and 209A. In some embodiments, the anchor 209B comprises an anchor block 302 with two sloped faces 304, a base 306, tapered surface 308, apex 310 and an opening or aperture 312 that is characterized by an aperture diameter 315. In the embodiment shown in FIGS. 3A and 3B, the anchor 209B has one aperture 312.

The faces 304 may be symmetrical and presented on both sides of anchor body 302, with apertures 312 formed as a through-hole in anchor body 302 communicating from one face 304 to the other face 304 (i.e. one side to the other). A tapered surface 308 (including sloped faces 304) extends from the base 306 of anchor 209B, until reaching an apex 310. A diameter of base 306 is therefore larger than a length of a top edge of the apex 310.

As may be appreciated, by including the smooth tapered surfaces of anchor 209B, the overall design of front side 201 of placemat 203 can provide for a contiguous, smooth surface profile substantially void of crevices, nooks or crannies in which food, liquids or germs can get stuck. Such a design of placemat 203 may facilitate efficient and effective cleaning with a cloth, disinfecting wipe, or other cleaning agent. The apertures 312 may be sized to enable a wipe to be passed through. For example, in some embodiments, the apertures 312 may be between 5 mm and 15 mm, or more preferably, between 5 mm and 10 mm; in some embodiments, the apertures 312 are 6 mm in diameter.

In some embodiments, an anchor may have a similar construction as described above—comprising an anchor block, faces, a base, a tapered surface and an apex—but the anchor may be larger than described and depicted and have two or more apertures. It may be appreciated that anchors having any number of apertures may be combined on a placemat. For example, in the case of a smaller placemat, such as one configured to provide for younger babies, for improved portability, or for smaller surfaces, anchors having only one aperture may be desirable to save space and create a more compact overall placemat design. In the case of a larger placemat, one or more anchors may be provided with two apertures each, to allow for the attachment of more items or toys. Regardless of their number in any given anchor block, aperture(s) 312 are structured to receive an elongated tether, such as the elongated tether 501 that is described with reference to FIG. 5, for attaching toys, utensils or other items to placemat 203.

FIG. 4A is a cross-sectional perspective view taken along section A-A of FIG. 2B; FIG. 4B is a cross-sectional view taken along the same section A-A. FIGS. 4A and 4B illustrate additional details of the exemplary anchor 209B showing the integrated structure of anchor body 302 with suction cup 212B extending from the back side 202 of placemat 203. Due to this integrated structure as well as the symmetrical tapered design of anchor body 302, a user may grip the tapered faces 304 of anchor body 302 between his or her fingers (e.g., thumb and forefinger), and effectively apply force F (dashed arrow in FIG. 4A) and communicate such force directly to exemplary suction cup 212B. Accordingly, suction cup 212B (and other suction cups 212A and 212B) may be secured with more force to a substrate, thereby providing improved securement of the exemplary placemat 203 to a variety of surfaces, whether horizontal or vertical. Further, the integrated structure of anchor 209B with suctions cup 212B may be robust over repeated use and less prone to failure compared with other suction cup designs.

In some embodiments, suction cup 212B may be provided in a state where a rim 402 edge is in a normally recessed position relative to the back-side surface 202, such that the suction cup 212B will not engage with a surface or substrate upon which placemat 203 is positioned unless there is an external application of force F to the anchor 209B. In other embodiments, the suction cup 212B, including its rim 402, extends slightly below the back-side surface 202, but a force F may still be required to evacuate sufficient air between a surface and the suction cup 212B to create a strong suction force. In some embodiments, the configuration of the suction cup 212B relative to the back-side surface 202 may enable the placemat 203 to lay substantially flat against the substrate to which it is adhered.

FIG. 4B is a cross-section view taken along section A-A of FIG. 2B and illustrates additional detail of an exemplary anchor 209B. In some embodiments, the anchor 209B comprises the anchor block 302 with aperture 312, and suction cup 212B. Suction cup 212B has a sealing surface 403 and an outer surface 406. A stem 409 connects the suction cup 212B to the anchor block 302, through a thickness 412 of the mat body 205, such that the anchor block 302 extends from the front side 201 of the mat body 205 and the suction cup 212B extends from the back side 202 of the mat body 205. In some embodiments, the suction cup 212B is at least partially disposed within a recess 415 in the thickness 412 (or in some embodiments, a recess 415 or indentation 415 relative to a plane that corresponds with the back surface 202). In some embodiments the stem 409 is coaxial with the suction cup 212B, e.g., along an axis 427 that may run directly through the aperture 312. In some embodiments, the suction cup 212B is disposed directly opposite the anchor block 302, through the thickness 412.

In some embodiments, texture is added to either or both of the outer surface 406 and a wall 418 of the recess 415, to prevent the outer surface 406 from sticking to the wall 418. In some such embodiments, the texture comprises molded protrusions, such as the exemplary protrusion 421 (see also FIG. 2C). In some embodiments, the texture comprises a rough or matte finish on one of the outer surface 406 and the wall 418.

In some embodiments, the sealing surface 403 has a glossy surface to improve the ability of the suction cup 212B to stick to a corresponding substrate. In some embodiments, the back-side surface 202 also has a glossy finish to increase its coefficient of friction relative to common substrates such as table surfaces, window glass, bath tiles, etc. In some embodiments, the suction cup 212B includes an internal recess 424 that enables the suction cup 212B to be pushed closer to a corresponding substrate, such that additional air can be pushed out and a stronger suction created when force F is applied (see FIG. 4A).

The entire design of placemat 203 may be integrated and comprise a single molded article, including for example anchors 209A and 209B, suction cups 212A and 212B, and receptacle 220. Benefits of this design include a decreased tooling and manufacturing costs arising from a single material, and a single mold and one-step manufacturing process, requiring no additional assembly of components. An example of a suitable manufacturing process for placemat includes compression molding processes.

Suitable materials may include natural rubber, synthetic rubbers or rubber-like materials, and preferably materials capable of being compression molded, as well as being free from chemicals that are potentially harmful to human users, such as BPA, BPS, PVC and phthalates. In one example, placemat 203 may comprise food-grade silicone, and may also be dishwasher safe for easier cleaning and disinfection.

In some embodiments, the material is compressible to facilitate coupling between the elongated tether 106 and the anchor blocks 109 shown in FIGS. 1A and 1B. For example, the material may have a Shore A durometer hardness of about 45 to about 65, or more preferably, of about 50 to about 60. ("About" in this disclosure may mean, for example, within 1%, or 5%, or 10% or 20% of the nominal value.)

FIG. 5 is a perspective view of an example elongated tether 501 suitable for use with an exemplary placemat, such as placemat 103 or placemat 203. Elongated tether 501 comprises an anchor end 504 and a retention end 507. The anchor end 504 includes an anchor terminus 510, which, in some embodiments, is generally spherical and characterized by an anchor diameter 513. The anchor diameter 513 is configured to interface with an aperture of an anchor block, such as the aperture 312 of the anchor block 209B, via an interference or compression fit. That is, the anchor terminus 510 is dimensioned to have an anchor diameter 513 that is larger than the aperture diameter 315 of the aperture 312, while a tether diameter 516 that characterizes the elongated tether 501 adjacent the anchor terminus 510 (e.g., segment 519) is smaller than the aperture 312. Furthermore, the material from which the anchor terminus 510 is made is compressible. Thus, the anchor 510 terminus can be compressed and manipulated into and through the aperture 312. Once the anchor terminus 510 passes all the way through the aperture 312, its compressible material expands to its nominal dimension, in which state the anchor diameter 513 is larger than aperture diameter 315—thereby securing the elongated tether 501 to the anchor block 209B. In FIGS. 1A and 1B, elongated tether 106 is shown as being secured to anchor 109 in the manner just described.

In some embodiments, the material for the elongated tether 501 is the same as the material for the placemat 203 and anchor block 209B. In some embodiments, this material is a food grade silicone having a Shore A durometer hardness of about 45 to about 65, or more preferably, of about 50 to about 60. In some embodiments, in addition to the anchor terminus 510 being compressible, the aperture 312 may be expandable (e.g., elastic), such that the anchor diameter 513 shrinks and the aperture diameter 315 expands as the elongated tether 501 is secured to the anchor block 209B.

A compressible and elastic material that is safe for human oral contact, such as food-grade silicone, has additional advantages. For example, a tether 501 comprising such material may be suitable for teething by a baby or toddler user. Moreover, compressibility and elasticity may promote development of a user's dexterity, finger strength and fine motor skills as the user manipulates the tether 501 or objects attached thereto.

As shown in FIG. 5, the elongated tether 501 also comprises a retention terminus 522 at its retention end 507, characterized by a retention diameter 524; and a series of retention apertures 525A, 525B and 525C, each of which is characterized by a retention aperture diameter 528. The retention terminus 522 and retention apertures 525A, 525B and 525C are also configured to interface with each other via an interference or compression fit, like the anchor terminus 510 and aperture 312. That is, the nominal diameter 528 of the retention apertures 525A, 525B and 525C is smaller than the nominal retention diameter 524 of the retention terminus 522, but larger than a diameter 529 of a stem portion 530 of the elongated tether 501. The material of the elongated tether 501 is compressible, such that the retention terminus 522 can be compressed and/or the retention apertures 525A, 525B and 525C can be expanded, enabling a user of the elongated tether 501 to form a loop using the retention end 507 of the elongated tether 501 to secure a toy, cup or other utensil (as is depicted in another embodiment in FIGS. 1A and 1B, with elongated tether 106, toy 118 and cup 121).

In some embodiments, the elongated tether 501 comprises three retention apertures 525A, 525B and 525C, enabling a user to vary a size of the loop formed when the retention terminus 522 is secured in one of the retention apertures— e.g., a relatively smaller loop is formed when the retention terminus 522 is secured in the retention aperture 525C; and a relatively larger loop is formed when the retention terminus 522 is secured in the retention aperture 525A.

In some embodiments, more or fewer retention apertures may be provided than shown in FIG. 5. In some embodiments, the retention diameter 524 is the same as the anchor diameter 513; in other embodiments, the retention diameter 524 and anchor diameter 513 are different, as is the retention-aperture diameter 528 and the aperture diameter 315—in order to force users to secure the anchor terminus 510 only to anchor block 209B and the retention terminus 522 only to retention apertures 525A, 525B or 525C.

As shown in FIG. 5, elongated tether 501 also comprises an elastic region 535 whose design may facilitate stretching of the elongated tether 501 along its length. In some embodiments, the material from which the elongated tether 501 is made is elastic, such that the elastic region 535 stretches out when pulled but returns to its original state when a pulling or stretching force is removed. In some embodiments, the entire elongated tether 501 may stretch, including the segments 519, 530 and 533 and points in-between, though the elastic section 535 may provide greater elasticity than the other portions.

In FIG. 5, the elastic region 535 is depicted as a two-dimensional serpentine winding of the material of the elongated tether 501 along the same relatively two-dimensional plane. In contrast with a three-dimensional spring or helical structure, the depicted elastic region 535 may be less likely to become tangled when twisted around and used by a baby or young child. In addition, this structure may maintain its functionality stably over repeated use. Further, a two-dimensional serpentine winding design may facilitate easier manufacturing (e.g., through a single-step compression molding process).

In some embodiments, the elastic section 535 may comprise fewer serpentine winding sections. The elastic sections 535 of elongated tethers 106 and 501 are shown as comprising five back-and-forth half-circular arcs, but a smaller or larger number of back-and-forth half-circular arcs could be provided. By varying the length of the elastic section 535 (e.g., by varying the number of back-and-forth half-circular arcs), a maximum length (or maximum length given a certain amount of force) can be set. For example, in some embodiments, the elongated tether 501 is configured to not exceed 12 inches when subjected to five pounds of stretching force. Such design parameters may be set, in some embodiments, to meet governmental regulations, such as regulations designed to minimize choking or strangulation hazards. In some embodiments, the length of the segments 519, 533 and 530 may also be varied to provide an elongated tether 501 that is longer or shorter or that facilitates the securing of smaller or larger objects. Numerous variations are possible to the design of the elongated tether without departing from the scope of this disclosure.

With the elastic section 535, the elongated tether 501 can provide an expandable zone for objects to be moved around a corresponding placemat 203, and provide a baby or other user physical feedback in response to stretching and pulling motions that can aid in motor-skill development and coordination. Further, the elastic section 535 can absorb some of the stretching and pulling force that is applied to the overall elongated tether 501, which can, in some embodiments further secure a connection between the anchor terminus 510 and an aperture 312 of an anchor block 209B.

Figure 6:
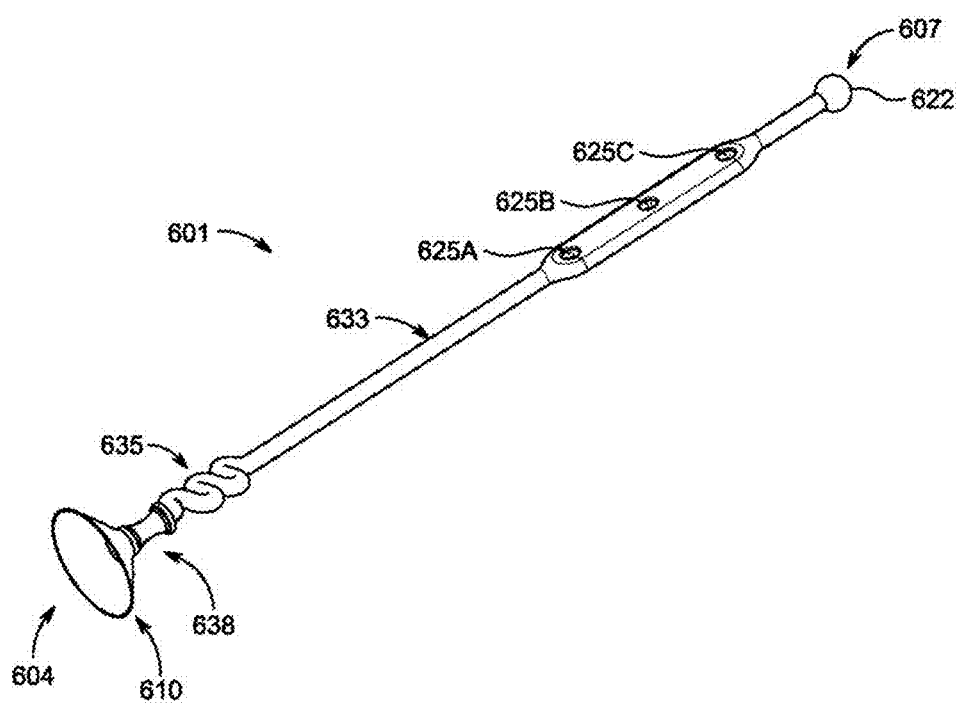
FIG. 6 is a perspective view of another embodiment of a tether.

FIG. 6 shows another embodiment of an elongated tether 601. In this embodiment, the elongated tether has an anchor end 604 and a retention end 607, and the retention end 607 operates in a similar manner as the retention end 507 described with reference to FIG. 5. That is, a retention terminus 622 can engage, via an interference or compression fit, into one of a plurality of retention apertures 625A, 625B or 625C to retain an object. Similar to the elongated tether 501, the elongated tether 601 comprises an elastic section 635. However, in this embodiment, elongated tether 601 comprises a suction cup 610 in place of the generally spherical terminus 510. As shown, the elongated tether 601 comprises a grip 638 adjacent the suction cup 610 that is suitable for gripping, for example, by a user's thumb and forefinger. In some embodiments, the elongated tether 601 can be provided with one or more elongated tethers 501 and a corresponding placement 203 in a "kit" that can provide a number of different tether options. For example, elongated tether 601 could be used in vertical-mount applications, such as with a placemat 203 mounted to a patio door, window or tiled wall adjacent a bath tub, to provide additional tethering options next to or independent of a placemat 203.

Figure 8:
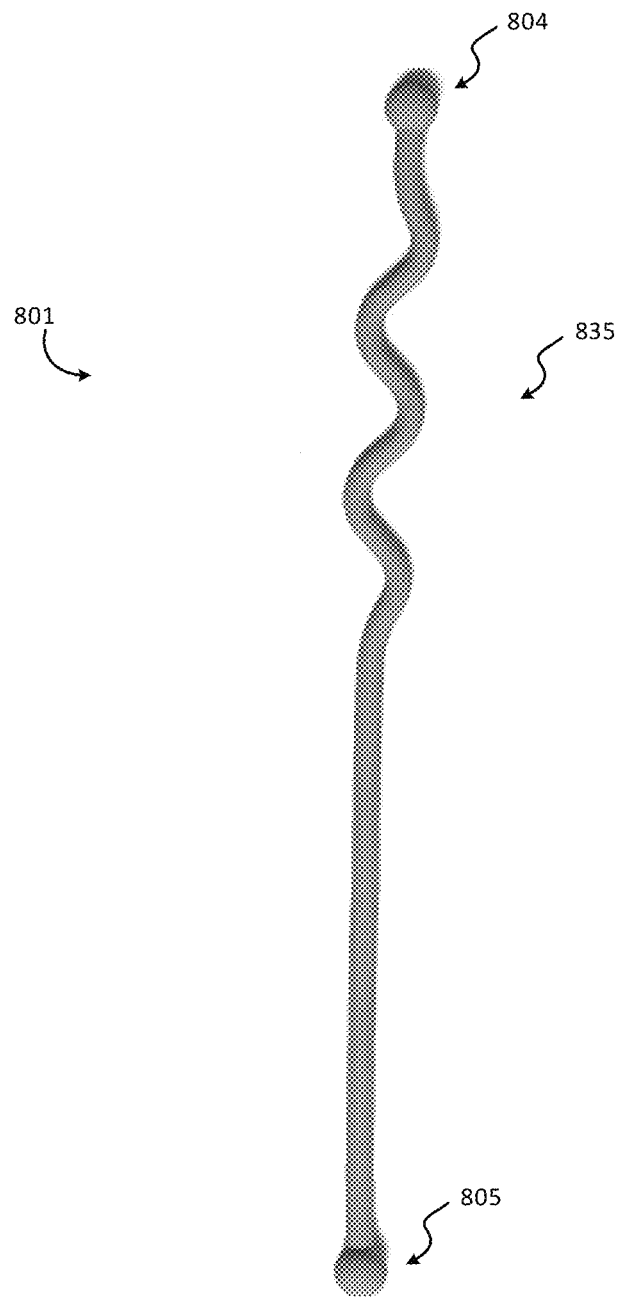
FIG. 8 is a perspective view of another embodiment of a tether.

FIG. 8 shows another embodiment of an elongated tether 801. In this embodiment, the elongated tether 801 has two anchor ends 804 and 805. Each anchor end 804 and 805 functions in a similar manner as the anchor end 504 described with reference to FIG. 5. That is, the anchor end 804 and 805 may be compression fit into the aperture of an anchor block on one end (e.g., anchor block 109, as shown in FIG. 1B) and an aperture of another object (e.g., a teething spoon) that is configured to be anchored to the anchor block.

In this embodiment, as elastic section 835 is provided and can perform a similar function as the elastic section 535 shown in and described with reference to FIG. 5. In this embodiment, the elastic section 835 comprises a number of arcs that are more gradual than the back-and-forth serpentine sections of tether 501. In some embodiments, more gradual curves in this section 835 may result in a tether that is able to withstand significantly more applied cycles of stretching force than other designs—with less chance of cracks or breaks.

The elongated tether 801 may be used to couple a placemat with another object that has a circular compression-fit retention aperture, as do the above-described anchor blocks on an exemplary placemat. For example, in some embodiments, the elongated tether 801 may be used to couple a teething spoon to a placemat, as will be described with reference to FIG. 9 and following.

FIG. 7 is a perspective view of a placemat and tether system 100 in use. FIG. 7 shows the front side 201 of placemat 203 and elongated tether 501 in use as a system 100, including an example of a cup 121 attached to elongated tether 501, which is anchored to placemat 203. The anchor terminus 510 of the elongated tether is shown disposed through aperture 312 of anchor 209A and secured via an interference fit. The retention terminus 522 is placed through aperture 525C and secured via an interference fit. As described with reference to FIG. 5, the anchor terminus 510 and retention terminus 522 may be generally spherically shaped, with diameters that are nominally (e.g., in a non-compressed state) larger than the apertures with which they engage. In some embodiments, the termini may be mushroom-shaped, or shaped in any other manner that permits an interference fit sufficiently strong to resist the expected forces that a user, such as, for example, a baby, young child or adult with a movement disorder, may apply.

Once an anchor terminus 510 or retention terminus 522 regains its original diameter after being pushed through a corresponding interference-fit aperture, the interference fit is not easily overcome. That is, the elongated tether 501 is not easily pulled from the anchor 209A, nor is it easily disconnected from the cup 121 or other object. Rather, to detach the elongated tether 501 from anchor 209A, a user (such as a caregiver) may need to engage fine dexterity and enough force to massage and manipulate the anchor terminus 510—e.g., by pushing on it at the same time and holding a portion of anchor 209A stable, until the anchor terminus 510 has been compressed down and passed back through aperture 312. Accordingly, with the exemplary design shown in FIG. 7, it may exceedingly difficult for even a determined baby or young child to break the elongated tether 501 free of the anchor 209A, due to the characteristics and dimensions of the materials used for placemat 203 and elongated tether 501; their selected hardness durometer; the dimensions and geometries of the apertures 312, 525A, 525B and 525C; the dimensions and geometries of the anchor terminus 510 and retention terminus 522; and the manner of securing the interference fit, for example.

To further increase security of the above-described attachments, a face 324 of one or more anchors, such as the anchor 209A, may be angled relative to the user's normal position, such that any attempts to pull on tether 501 toward their body or within their zone of reach would be made at an angle relative to an axis of the aperture 312, thereby causing the anchor terminus 510 to be misaligned with that aperture 312 axis. For example, with reference to FIG. 2B, the face 324 may be positioned at an angle 231 relative to a side of the placemat 203. In some embodiments, the angle is between about 30 and 60 degrees; in some embodiments, the angle is about 45 degrees.

Although elongated tether 501 has been described as one example of a suitable means of attachment using anchors 209A and 209B, it may be appreciated that other attachment means compatible with apertures 312 may also be utilized, including rings, straps, etc. In one embodiment, placemat 203 and tether 501 are provided as a placemat system 100; in other embodiments, placemat 203 and tether 501 are provided or sold separately; in still other embodiments, elongated tether 601 may be provided separately or as part of system 100 with placemat 203 and/or tether 501.

Placemat 203, elongated tether 501, as well as the combined system 100 therefore provide numerous advantages, including, for example, reducing the burden and challenges of child care or patient care and promoting child development and safety. For example, careful and supervised use of placemat 203 or its system 100 on a vertical surface, such as attached to a refrigerator door, patio door or window, may promote development of a child's standing and balance, and may keep a child preoccupied and out of the way of active caregivers while they are preparing food or engaging in other tasks. When placemat 203 or system 100 is attached to bathtub wall, tethered bath toys may be kept within reach of the baby, preventing them from floating away.

System 100 comprising placemat 203 and elongated tether 501 can be used in a horizontal application, such as with a high chair. In some embodiments, the retention apertures 525A, 525B and 525C are dimensioned to accommodate a crayon, marker or utensil, without use of the retention terminus 522; that is, in such embodiments, a marker or utensil may be retained by the apertures 525A, 525B and 525C themselves. In some embodiments, spacing between the retention terminus 522 and the retention apertures 525A, 525B and 525C is configured such that a loop may be formed by engaging the retention terminus 522 with one of the retention apertures 525A, 525B or 525C that can accommodate common utensils or toys, such as large, easy-grip toddler utensils, large markers, baby cup handles, etc.

In some embodiments, the front surface 201 of placemat 203 is configured in material and texture to enable the front surface to be an erasable writing surface when used with appropriate markers or other toddler-appropriate writing or drawing implements. That is, in such embodiments, that front surface 201 may be easily washable yet textured to receive and temporarily retain marker ink—thereby providing a writing surface 201 that may occupy toddler users after a meal, which could first be served on the same surface 201.

Figure 9:
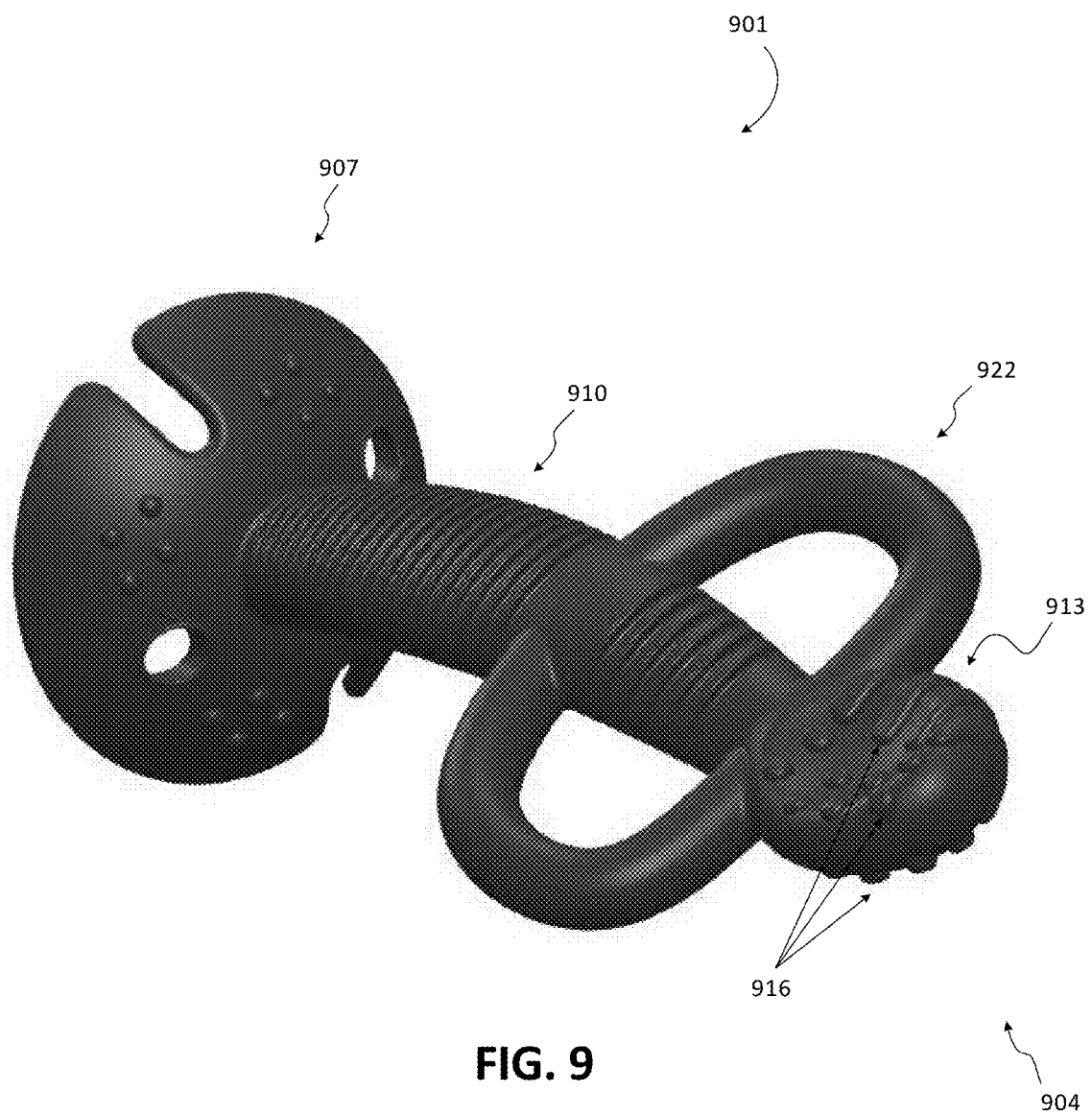
FIG. 9 is a perspective view of an exemplary teething spoon.

FIG. 9 illustrates an exemplary teething spoon 901 that can be removably coupled to a placemat with a tether (e.g., like the tether 801 that was just described). As shown, the teething spoon 901 includes a feeding end 904 and a base 907 opposite the feeding end 904. A handle 910 couples the feeding end 904 and the base 907.

In some embodiments, the entire teething spoon 901 is made of a soft and/or compliant material that is safe and suitable for teething by a baby or toddler. For example, the material could be a food-grade silicone—and in particular, a food-grade silicone having a Shore A durometer of between about 45 and about 65.

In some embodiments, the feeding end 904 has a bowl-like concave surface 913. The concave surface 913 may be textured, for example, with a plurality of protrusions 916. In some embodiments, such protrusions 916 may be configured to "grip" foods (e.g., apple sauce, yams, other soft foods; peas, corn, other smooth-skinned items that may be prone to rolling off). In some embodiments, such protrusions 916 may be further configured to stimulate the mouth, tongue and gums of a baby or toddler—for example to sooth the gums during teething and to enhance sensory exploration and speech development. In some embodiments, the overall shape and texture (e.g., depth of the bowl-like concave surface 913, the height and number of the protrusions 916) may be configured to limit the amount of food that can be retained by the feeding end 904, to, for example minimize a risk of gagging or choking by a baby or toddler who is learning to feed him or herself.

Figure 10:
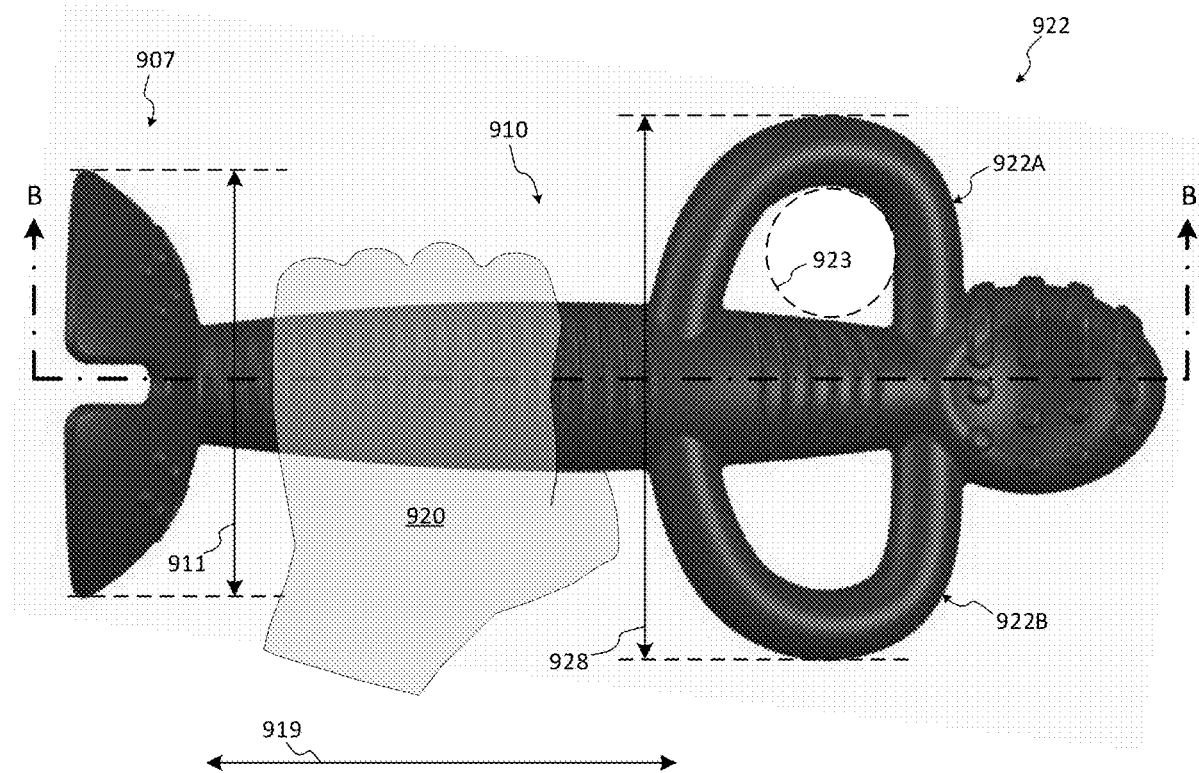
FIG. 10 is a top view of the exemplary teething spoon shown in FIG. 9.

Turning to FIG. 10, the handle 910 may be configured to promote grasping by a baby or toddler. That is, in some embodiments, a portion 919 of the handle (e.g., a portion 919 between the base 907 and a safety guard 922) is dimensioned to accommodate the hand 920 of an average toddler. For example, a portion 919 of the handle may be at least 45 mm; as another example, the portion 919 may be at least 70 mm; as other examples, the portion 919 may be at least 30-50 mm, 40-60 mm, 50-70 mm, 45-95 mm, etc.

To facilitate gripping by small fingers and to further enhance sensory development, the handle 910 may have a ribbed or otherwise textured surface. As shown in FIGS. 9 and 10, the handle 910 may be curved and/or tapered to further enhance gripping, comfort, and overall aesthetic appearance.

The teething spoon 901 may include features to prevent choking or gagging. For example, the base 907 can be structured to extend out from the handle, such that it has a base diameter 911 at its greatest extent. In some embodiments, the base diameter 911 is at least 50 mm. In the embodiment shown, the base 907 is a generally hemispherical structure, but other shapes can be employed. Near the feeding end 904, the teething spoon 901 also includes a safety guard 922, which also extends out from the handle 910.

Figure 11:
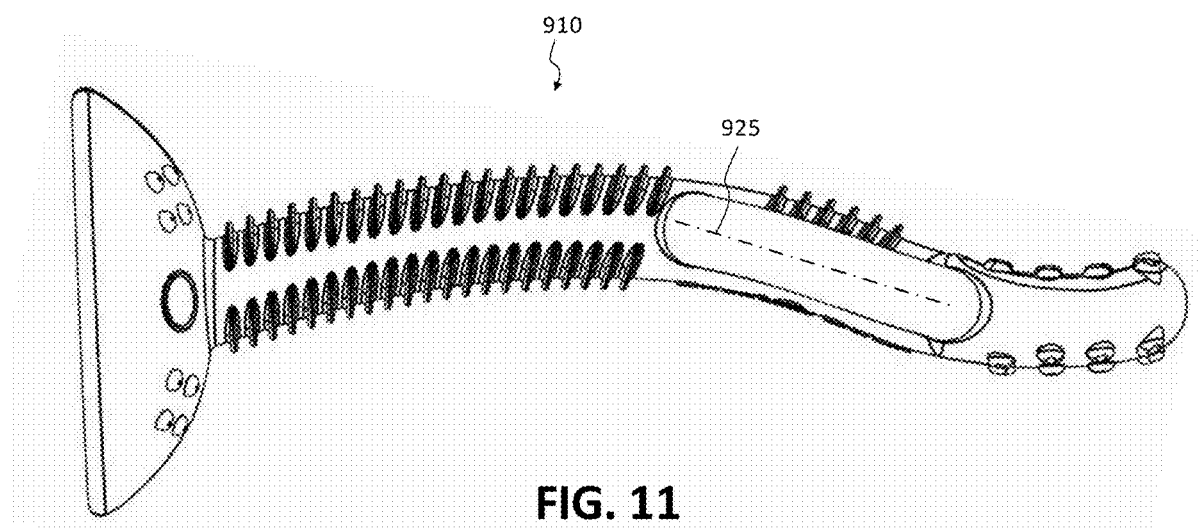
FIG. 11 is a side view of the exemplary teething spoon shown in FIG. 9.

With reference FIGS. 9, 10 and 11, the safety guard 922 may extend perpendicular to an axis (e.g., a local axis 925) of the handle 910; and like the base 907, the safety guard 922 may have a perpendicular reach 928 that, in some embodiments, is at least about 50 mm. A safety guard 922 that is so structured may prevent gagging or choking by a baby or toddler by preventing the teething spoon 901 from being inserted too deeply into the baby's or toddler's mouth.

As depicted in FIG. 10, the safety guard 922 may include two open loops 922A and 922B that can further facilitate grasping by a baby or toddler. The loops 922A and 922B may be in-plane with each other and on opposite sides of the handle 910, or they may have a different configuration. In other embodiments, the safety guard 922 may have a closed structure. In embodiments in which the safety guard 922 includes open loops, an inner dimension of the loops may be configured to prevent pinching or entrapment of small fingers. For example, in some embodiments, the safety guard 922 is configured to permit passage of a 10 mm diameter cylinder (depicted by element 923) unobstructed. In other embodiments, the safety guard 922 is configured to permit unobstructed passage of a 13 mm cylinder.

Figure 12:
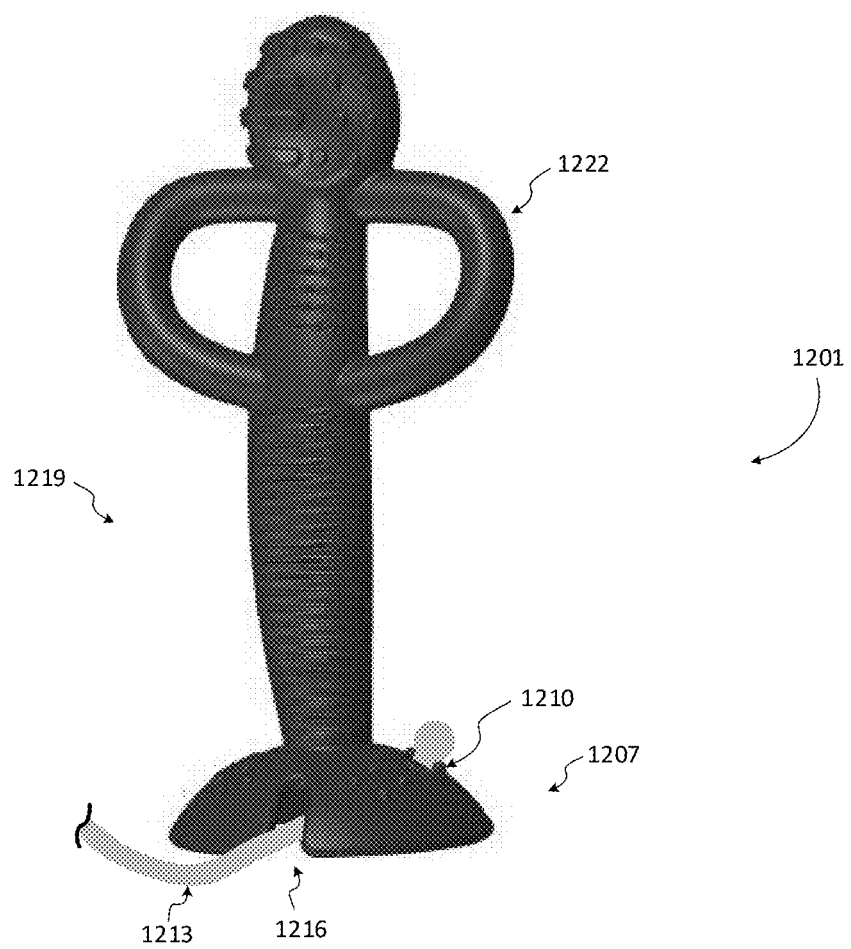
FIG. 12 is a perspective view of an exemplary teething spoon situated vertically.

As depicted in FIG. 12, some embodiments of a teething spoon 1201 are configured to enable the teething spoon 1201 to be situated or disposed vertically—even when tethered to another object. In particular, a base 1207 can include an aperture 1210 for receiving a removable tether 1213 and a slot 1216 that is configured to accommodate the removable tether 1213 when the teething spoon 1201 is disposed vertically, and when the removable tether 1213 is anchored by the aperture 1210 and disposed through the aperture 1210 from an interior of the base 1207 (e.g., from the interior of a generally hemispherical structure, in some embodiments).

Although the base 1207 is shown as a generally hemispherical hollow structure, the base 1207 may take other forms in other embodiments. For example, the base 12017 could be circular but flat, with the slot 1216 omitted and the aperture 1210 disposed on a handle 1219. As another example, the base 1207 could include loops or extensions similar to the safety guards 1222. Such loops could extend in two directions, three directions (e.g., forming a tripod-like structure), four dimensions (e.g., forming a cross structure), etc. Such alternative structures may or may not be configured to enable the teething spoon 1201 to be disposed vertically.

Figure 13A:
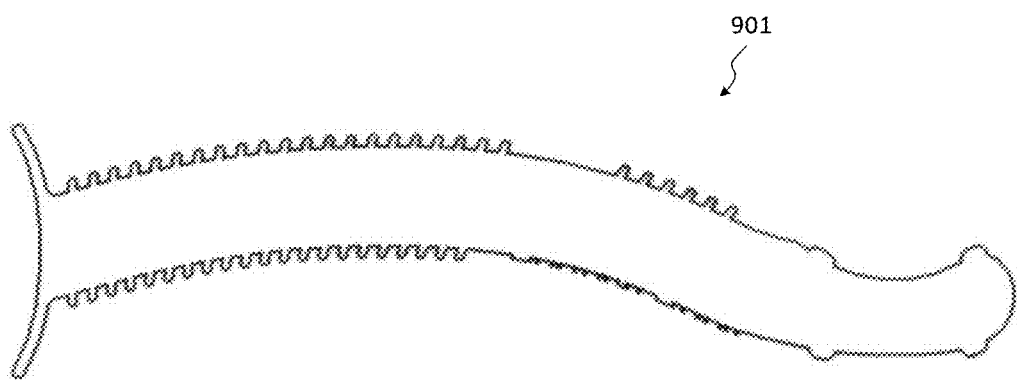
FIG. 13A is a cross-sectional view taken along line B-B of the exemplary teething spoon of FIG. 10.

FIG. 13A illustrates an exemplary cross-sectional side view of the teething spoon 901 that is shown in FIG. 10, with the cross-section taken along lines B-B. As shown in this embodiment, the teething spoon 901 may comprise a single material throughout, facilitating molding in a single step. As mentioned, this material could be a food-grade silicone that is safe for teething by babies and toddlers. Alternatively, the material could be a natural rubber, an organic cotton-based material, an ethylene vinyl acetate (EVA) or EVA foam, a food-grade plastic (e.g., polyethylene), or another material that is safe for teething.

Figure 13B:
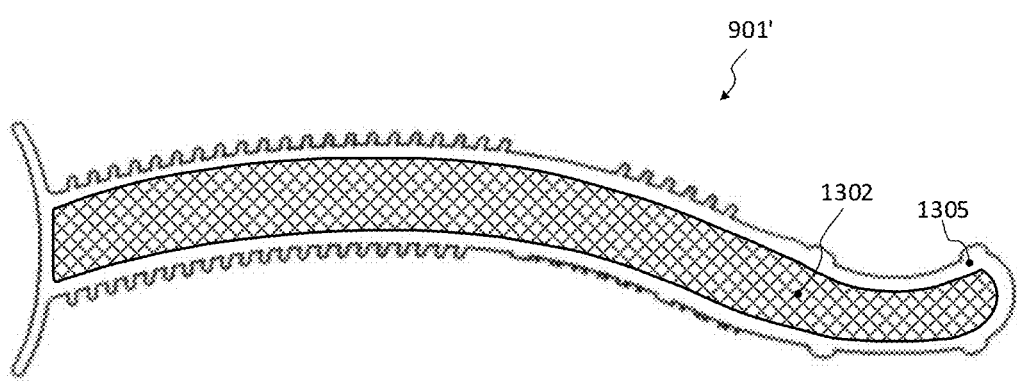
FIG. 13B is a cross-sectional view of another exemplary teething spoon.

FIG. 13B illustrates a cross-sectional side view of another embodiment of teething spoon 901'. In this embodiment, the teething spoon 901' may comprise two layers. In particular, the teething spoon 901' can include an inner layer 1302 and an outer layer 1305. The outer layer 1305 may be a food-grade silicone having a Shore A durometer of about 65, and the inner layer 1302 may be a silicone or nylon material (or any other suitable material) having a greater hardness than the outer layer 1305. In such an embodiment, the outer layer 1305 can provide a surface that is suitable for gripping and teething, while the inner layer 1302 can provide additional rigidity, which may provide additional strength and durability. Other variations are possible. Different materials could be used; there could be more than two layers; Shore A durometer values could be higher or lower (e.g., 20, 25, 30, 35, 40, 45, 50, 55, 60, 65, 70, 75, 80, 85, 90); etc.

FIG. 14 illustrates a system 1401 that includes a mat 1403 having an anchor 1406, an elongated tether 1409, and a teething spoon 1412. In some embodiments, the mat 1403 has a construction like the embodiments illustrated in and described with reference to the preceding figures (e.g., with anchor block(s) and corresponding suction cup(s) with sealing surfaces). The elongated tether 1409 may have a similar structure to the elongated tether 501 shown in FIG. 5 or the elongated tether 801 shown in FIG. 8 (e.g., with an anchor end that is configured to interface with an anchor block via, for example, a compression fit).

FIGS. 15A and 15B illustrate alternative embodiments for tether anchors. As shown, a carabiner 1515 may be employed as an anchor for a tether 1509. Other types of anchors are possible. For example, a ring 1518 could be employed to anchor an object. Such a ring 1518 may include anchor nubs 1521 that are configured to prevent removal of the ring 1518 from an aperture (e.g., an aperture 1523 of a teething spoon 1512), absent a sufficient force that overcomes a compression-fit force. A ring 1518 or carabiner 1515 may be configured to fit in an aperture 1523 and slot 1526 of a teething spoon 1512 (e.g., to facilitate its vertical disposition); or the ring 1518 or carabiner 1515 may be configured to simply interface with the aperture 1523. The elongated tether 1509 may have another construction, such as a series of chain links 1529, or an elastic or rope cord structure.

While several embodiments have been described with reference to exemplary aspects, it will be understood by those skilled in the art that various changes may be made and equivalents may be substituted for elements thereof without departing from the contemplated scope. For example, various materials could be used; hardness and structure of a teething spoon could be varied; dimensions and proportions could be varied; different structures for a base could be employed; a tether could take various forms; etc. In addition, many modifications may be made to adapt a particular situation or material to the teachings provided herein without departing from the essential scope thereof. Therefore, it is intended that the scope not be limited to the particular aspects or embodiments disclosed but include all aspects falling within the scope of the appended claims.

What is claimed is:

1. A teething spoon comprising:
   a feeding end comprising a concave surface;
   a base opposite the feeding end; the base having a base diameter, at least one aperture configured to receive and retain a removable tether, and a slot configured to accommodate such a removable tether when such a removeable tether is received and retained by the at least one aperture;
   a handle coupling the feeding end and the base; and
   a safety guard system adjacent the feeding end and comprising at least one open loop, wherein the handle has a longitudinal axis adjacent the safety guard system, the safety guard system extending perpendicular to the longitudinal axis of the handle and defining a reach when measured perpendicular to the longitudinal axis;
   wherein, the base diameter and reach are at least about 50 mm to prevent choking by a user who is teething on the teething spoon, and wherein the at least one open loop is dimensioned to allow unobstructed passage of at least a 10-mm diameter cylinder to prevent pinching or entrapment of a finger of the user.

2. The teething spoon of claim 1, wherein the feeding end comprises a textured surface having a plurality of protrusions configured to (a) stimulate a tongue, mouth or gums of a user of the teething spoon, or (b) retain food.

3. The teething spoon of claim 1, wherein the handle comprises a textured surface.

4. The teething spoon of claim 1, comprising a food-grade material having a Shore A durometer of between about 45 and about 65.

5. A teething spoon comprising:
   a feeding end comprising a concave surface;
   a base opposite the feeding end, the base having (a) a base diameter, (b) at least one aperture configured to removably receive and retain a tether, and (c) a slot configured to accommodate such a tether when said tether is disposed at least partly within an interior of the base and removably received and retained by the at least one aperture—such that the teething spoon can be disposed vertically on a surface;
   a handle coupling the feeding end and the base; and
   a safety guard system on the handle, adjacent the feeding end.

6. The teething spoon of claim 5, wherein the base has a generally hemispherical shape.

7. The teething spoon of claim 5, wherein the feeding end comprises a textured surface having a plurality of protrusions configured to (a) stimulate a tongue, mouth or gums of a user of the teething spoon, or (b) retain food.

8. The teething spoon of claim 5, wherein the handle comprises a textured surface.

9. The teething spoon of claim 5, wherein the safety guard system comprises a first loop and a second loop opposite and in plane with the first loop.

10. The teething spoon of claim 9, wherein an interior of the first loop and an interior of the second loop are configured to allow a 10 mm cylinder to pass through unobstructed.

11. The teething spoon of claim 9, wherein an interior of the first loop and an interior of the second loop are configured to allow a 13 mm cylinder to pass through unobstructed.

12. The teething spoon of claim 5, wherein the handle, base and safety guard system are configured to facilitate gripping the teething spoon at the handle and between the base and safety guard system.

13. The teething spoon of claim 5, wherein the base diameter is at least about 50 mm.

14. The teething spoon of claim 5, comprising at least an inner material and an outer material, the outer material comprising a food-grade silicone having a Shore A durometer of about 65, the inner material comprising a material having a greater hardness than the outer material.

15. The teething spoon of claim 5, comprising a food-grade material having a Shore A durometer of between about 45 and about 65.

16. A teething spoon comprising:
   a feeding end comprising a concave surface;
   a base opposite the feeding end, the base having a generally hemispherical structure with a base diameter, wherein the generally hemispherical structure has at least one aperture configured to receive and retain a removable tether and a slot that accommodates such a removable tether when said removable tether is disposed at least partly within an interior of the generally hemispherical structure to enable the teething spoon to be disposed vertically on a surface;

a handle coupling the feeding end and the base; and a safety guard on the handle, adjacent the feeding end.

17. The teething spoon of claim 16, wherein the base diameter is at least about 50 mm.

* * * * *